(12) United States Patent
Wang et al.

(10) Patent No.: US 11,985,417 B2
(45) Date of Patent: May 14, 2024

(54) MATCHING ACTIVE SPEAKER POSE BETWEEN TWO CAMERAS

(71) Applicant: Hewlett-Packard Development Company, L.P., Spring, TX (US)

(72) Inventors: Jian David Wang, Burnaby (CA); Xiangdong Wang, Carlisle, MA (US); Varun Ajay Kulkarni, Cedar Park, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 99 days.

(21) Appl. No.: 17/842,693

(22) Filed: Jun. 16, 2022

(65) Prior Publication Data

US 2022/0408015 A1  Dec. 22, 2022

Related U.S. Application Data

(60) Provisional application No. 63/202,570, filed on Jun. 16, 2021.

(51) Int. Cl.
| | |
|---|---|
| *H04N 23/60* | (2023.01) |
| *G06T 7/73* | (2017.01) |
| *G10L 17/06* | (2013.01) |
| *G10L 17/18* | (2013.01) |
| *G10L 25/57* | (2013.01) |
| *H04N 5/268* | (2006.01) |
| *H04N 23/611* | (2023.01) |

(Continued)

(52) U.S. Cl.
CPC ............. *H04N 23/64* (2023.01); *G06T 7/73* (2017.01); *G10L 17/06* (2013.01); *G10L 17/18* (2013.01); *G10L 25/57* (2013.01); *H04N 5/268* (2013.01); *H04N 23/611* (2023.01); *H04R 1/406* (2013.01); *H04R 3/005* (2013.01); *G06T 2207/10016* (2013.01); *G06T 2207/20084* (2013.01); *G06T 2207/30201* (2013.01)

(58) Field of Classification Search
CPC ...... H04N 23/64; H04N 5/268; H04N 23/611; H04N 7/147; H04N 23/90; G06T 7/73; G06T 2207/10016; G06T 2207/20084; G06T 2207/30201; G10L 17/06; G10L 17/18; G10L 25/57; G10L 17/00; H04R 3/005; H04R 27/00; H04R 2430/23
See application file for complete search history.

(56) References Cited

U.S. PATENT DOCUMENTS

| | | | | |
|---|---|---|---|---|
| 11,184,560 B1* | 11/2021 | Mese | ...................... | G10L 17/00 |
| 2011/0098056 A1* | 4/2011 | Rhoads | .................. | G06F 3/023 |
| | | | | 345/173 |

* cited by examiner

*Primary Examiner* — Yosef K Laekemariam
(74) *Attorney, Agent, or Firm* — Quarles & Brady LLP

(57) ABSTRACT

Described are multiple cameras in a conference room, each pointed in a different direction. A primary camera includes a microphone array to perform sound source localization (SSL). The SSL is used in combination with a video image to identify the speaker from among multiple individuals that appear in the video image. Pose information of the speaker is developed. Pose information of each individual identified in each other camera is developed. The speaker pose information is compared to the pose information of the individuals from the other cameras. The best match for each other camera is selected as the speaker in that camera. The speaker views of each camera are compared to determine the speaker view with the most frontal view of the speaker. That camera is selected to provide the video for provision to the far end.

20 Claims, 17 Drawing Sheets

(51) Int. Cl.
*H04R 1/40* (2006.01)
*H04R 3/00* (2006.01)

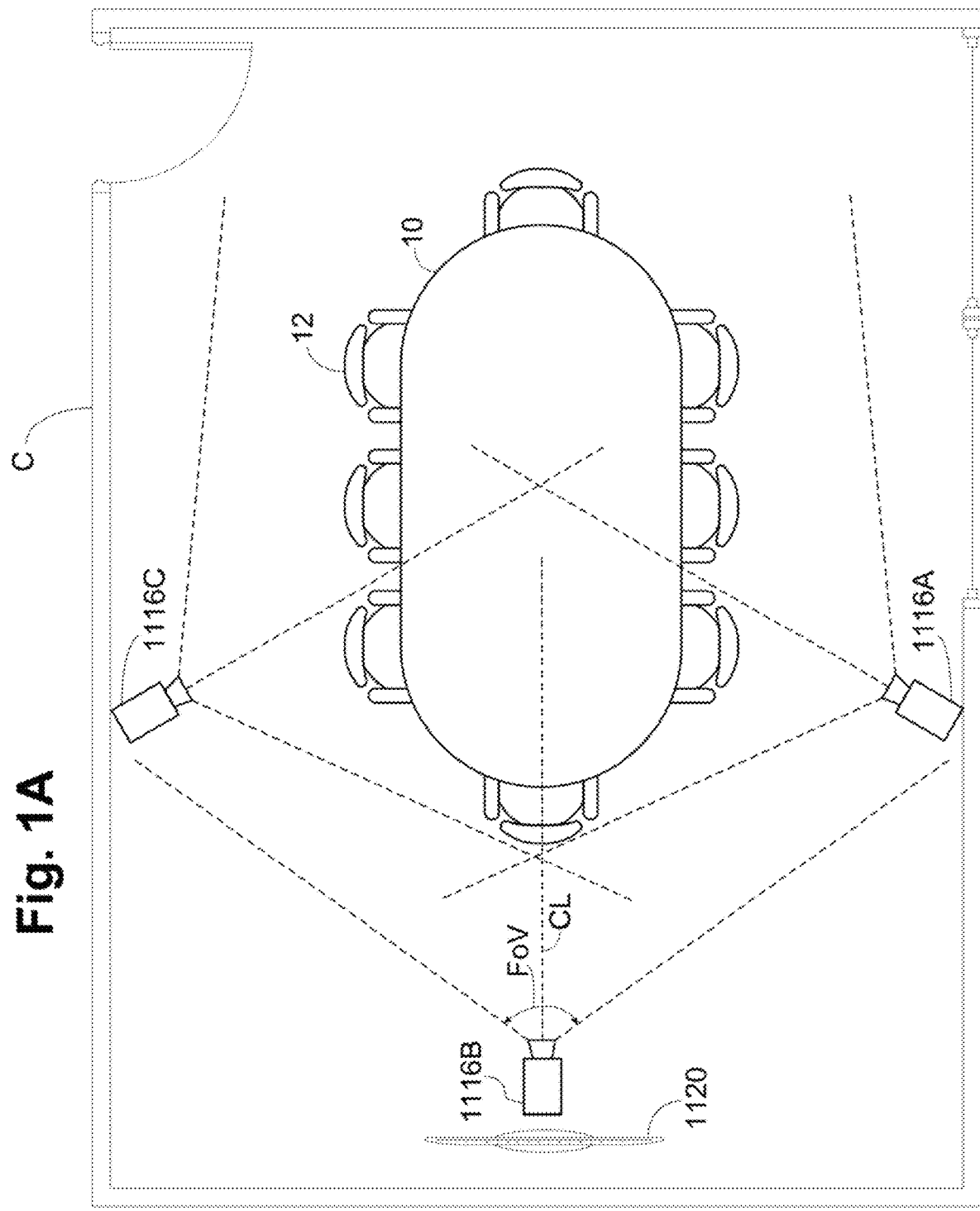

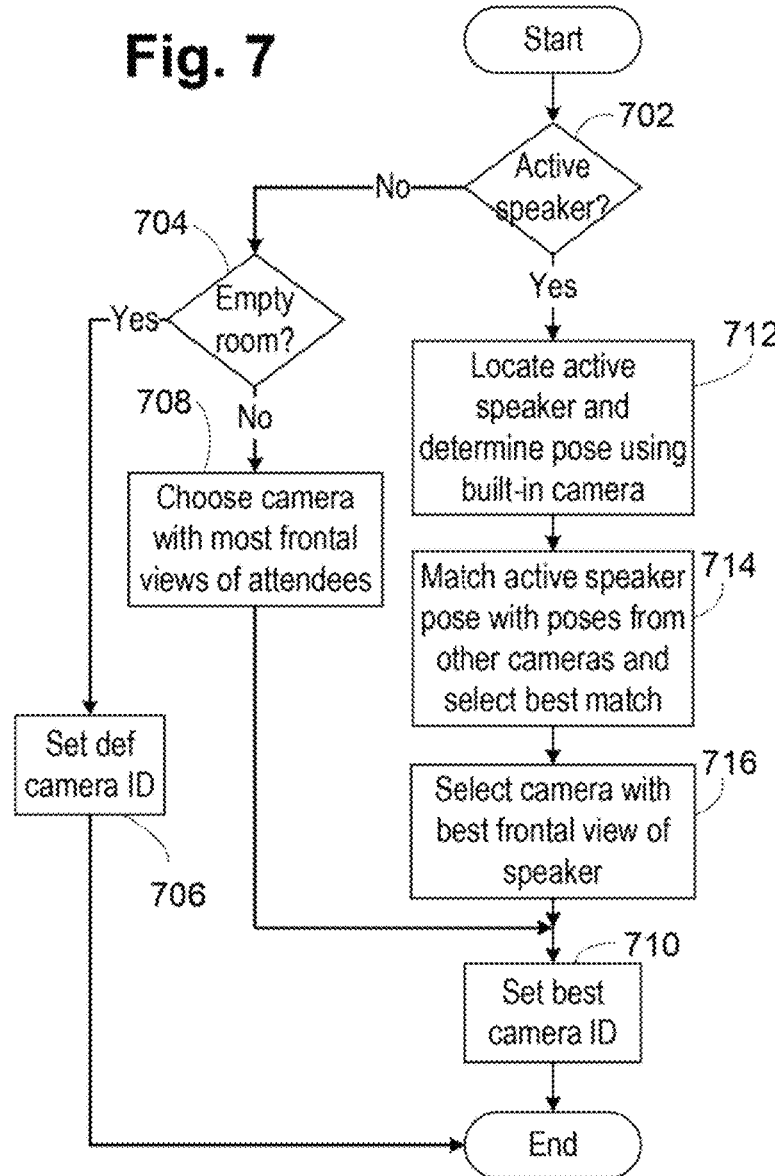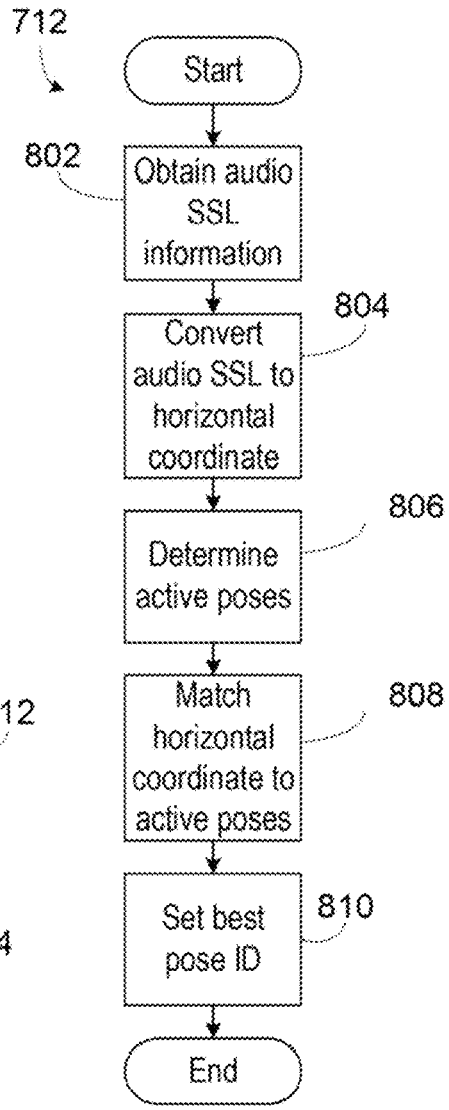

MATCHING ACTIVE SPEAKER POSE BETWEEN TWO CAMERAS

CROSS-REFERENCE TO RELATED APPLICATIONS

This application claims the benefit of U.S. Provisional Application No. 63/202,570, filed Jun. 16, 2021, which is incorporated by reference herein in its entirety.

BACKGROUND OF THE INVENTION

Field of the Invention

This disclosure relates generally to camera selection in a videoconference.

Description of the Related Art

The most common configuration of a conference room for videoconferencing has a single camera adjacent a monitor or television that sits at one end of the room. One drawback to this configuration is that if a speaker is looking at someone else in the conference room while talking, the speaker does not face the camera. This means that the far end only sees a side view of the speaker, so the speaker does not appear to be speaking to the far end.

Efforts have been made to address this problem by providing multiple cameras in the conference room. The idea is to have the cameras pointed in different directions and then selecting a camera that provides the best view of the speaker, preferably zooming and framing the speaker. The efforts improved the view of the speaker but only in single individual settings, which often were not a problem as the speaker would usually be looking at the monitor and hence the single camera. If multiple individuals were present in the conference room and visible in the various camera views, the efforts did not provide good results.

SUMMARY OF THE INVENTION

Described herein are a method, system, and non-transitory processor readable memory that provides for utilizing sound source localization using the microphone array on the primary camera to determine direction information; identifying a speaker in the group of individuals using the sound source localization direction information and an image from the video stream of the primary camera; determining pose information of the speaker in the image from the video stream of the primary camera; for each of the plurality of cameras other than the primary camera, determining pose information of each individual in the group of individuals in an image from the video stream of the primary camera; for each of the plurality of cameras other than the primary camera, comparing the pose information of each individual in the group of individuals with the pose information of the speaker, determining the best match and setting that individual as the speaker in the image from the video stream of the camera; and selecting a camera from the plurality of cameras to provide a video stream for provision to the far end based on a determination of the camera having the best frontal view of the speaker after setting an individual as a speaker for each camera.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIG. 1A is an illustration of a conference room containing three cameras, a monitor and desk and chairs;

FIGS. 1B-FIG. 5 are illustrations of the conference room of FIG. 0 with various individuals, with one individual speaking;

FIG. 7 is a flowchart of operation of a videoconferencing system according to an example of this disclosure;

FIG. 8 is a flowchart of operation of the speaker location and pose determination step of FIG. 7 according to an example of this disclosure;

DETAILED DESCRIPTION

Figure 1B:
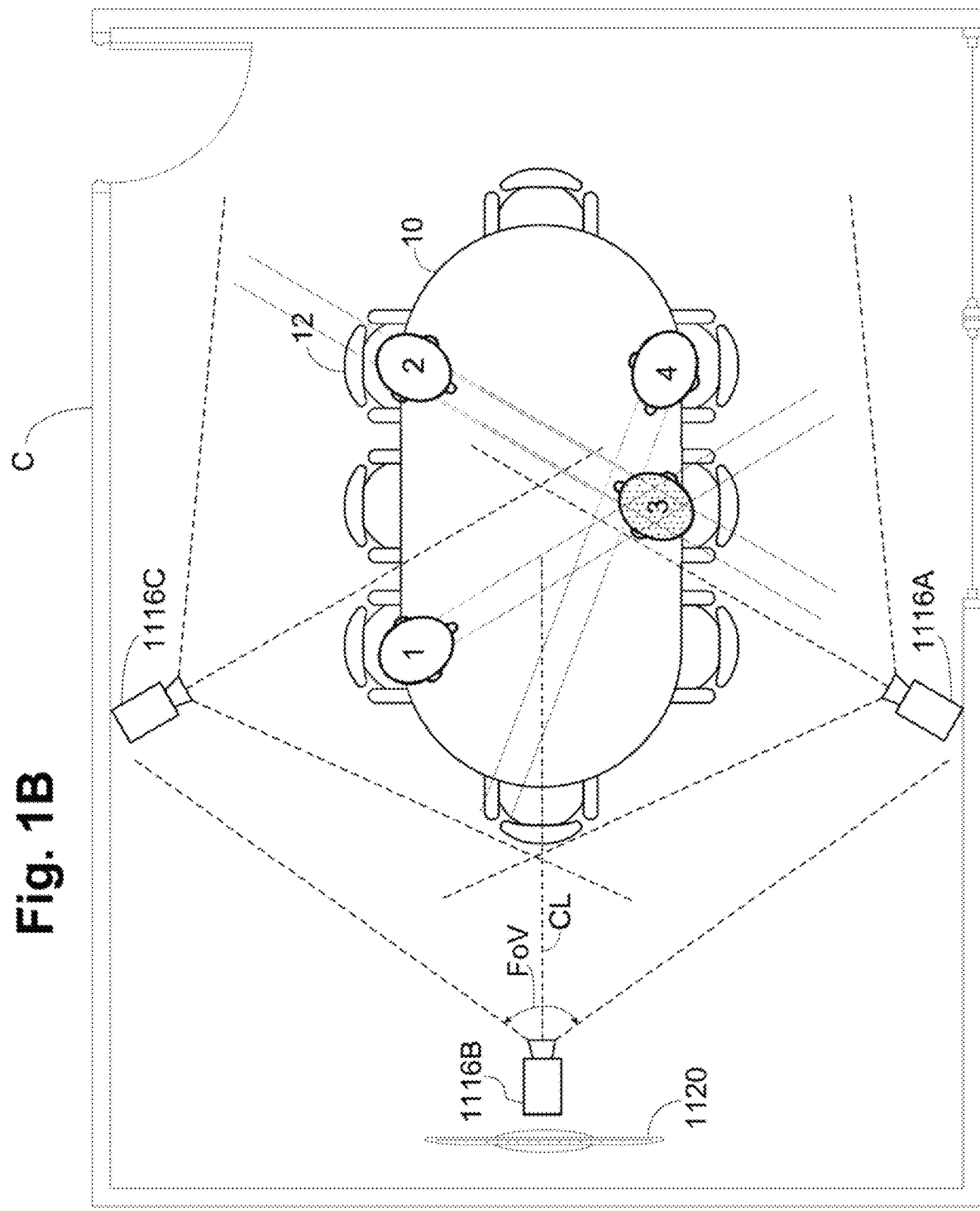

Implementations provide for a plurality of cameras embodied in various devices to be placed in an environment, such as conference room. One of the cameras is designated as a primary camera, and is implemented with a microphone array. A video stream is sent to a far end site from the primary camera. Sound source localization using the microphone array is used to determine sound direction information. A speaker of a group of individuals or participants is identified using the sound source location and an image from the video stream. Pose information of the speaker is determined from the image from the video stream. Pose information of each individual in the group is determined by the plurality of cameras other than the primary camera which is compared to pose information of the speaker and best match and setting of the speaker is determined. A camera is selected from the plurality of cameras to provide a video stream the far end site based on the best frontal view of the speaker.

In the drawings and the description of the drawings herein, certain terminology is used for convenience only and is not to be taken as limiting the examples of the present disclosure. In the drawings and the description below, like numerals indicate like elements throughout.

Throughout this disclosure, terms are used in a manner consistent with their use by those of skill in the art, for example:

Computer vision is an interdisciplinary scientific field that deals with how computers can be made to gain high-level understanding from digital images or videos. Computer vision seeks to automate tasks imitative of the human visual system. Computer vision tasks include methods for acquiring, processing, analyzing and understanding digital images, and extraction of high-dimensional data from the real world to produce numerical or symbolic information. Computer vision is concerned with artificial systems that extract information from images. Computer vision includes algorithms which receive a video frame as input and produce data detailing the visual characteristics that a system has been trained to detect.

A convolutional neural network is a class of deep neural network which can be applied analyzing visual imagery. A deep neural network is an artificial neural network with multiple layers between the input and output layers.

Artificial neural networks are computing systems inspired by the biological neural networks that constitute animal brains. Artificial neural networks exist as code being executed on one or more processors. An artificial neural network is based on a collection of connected units or nodes called artificial neurons, which mimic the neurons in a biological brain. Each connection, like the synapses in a biological brain, can transmit a 'signal' to other neurons. An artificial neuron that receives a signal then processes it and can signal neurons connected to it. The signal at a connection is a real number, and the output of each neuron is computed by some non-linear function of the sum of its inputs. The connections are called edges. Neurons and edges have weights, the value of which is adjusted as 'learning' proceeds and/or as new data is received by a state system. The weight increases or decreases the strength of the signal at a connection. Neurons may have a threshold such that a signal is sent only if the aggregate signal crosses that threshold.

Referring now to FIG. 1A, a conference room C configured for use in videoconferencing is illustrated. Conference room C includes a conference table 10 and a series of chairs 12. A series of three cameras, primary camera 1116B and secondary cameras 1116A and 1116C, are provided in the conference room C to view individuals seated in the various chairs 12. In various embodiments, the cameras 1116A, 1116B, 1116C are part of a video bar, pan-tilt zoom cameras, or other type of camera. Implementations further provide that such cameras be connected to connect to a computing device, such as a codec or a laptop computer. It will be further understood that other embodiments are also possible. A monitor or television 1120 is provided to display the far end conference site or sites and generally to provide the loudspeaker output. Each camera 1116A, 1116B, 1116C has a field-of-view (FoV) and an axis or centerline (CL). In the layout of FIG. 0, the cameras 1116A, 1116B, 1116C are positioned such that camera 1116B has its CL centered on the length of the conference table 10 and cameras 1116A and 1116C are at an angle to the conference table 10, so that camera 1116B is the primary camera. This allows the cameras 1116A and 1116C to have a better opportunity to see the faces of individuals seated on the sides of the conference table 10 when the individuals are looking at other individuals in the conference room C, while camera 1116B has a better opportunity to see the faces when the individuals are looking at the monitor 1120. At least the primary camera 1116B includes a microphone array 1214 to be used to do sound source localization (SSL). The secondary cameras 1116A, 1116C do not need to include a microphone array, so the cameras 1116A, 1116C can be simpler cameras than the main camera 1116B.

Turning now to FIG. 1B, four individuals 1, 2, 3, and 4 are seated in various of the chairs 12. Individual 3 is speaking, as indicated by the shading of individual 3. As individual 3 is speaking, each of the individuals 1, 2 and 4 have turned to look at individual 3. The camera 1116A is viewing the back of the head of individual 3, while camera 1116B is viewing basically the left ear of individual 3 and camera 1116C has the best shot of individual 3's face. Therefore, it is desirable to use the camera 1116C to provide a view of the face of individual 3 for provision to the far end.

Figure 2:
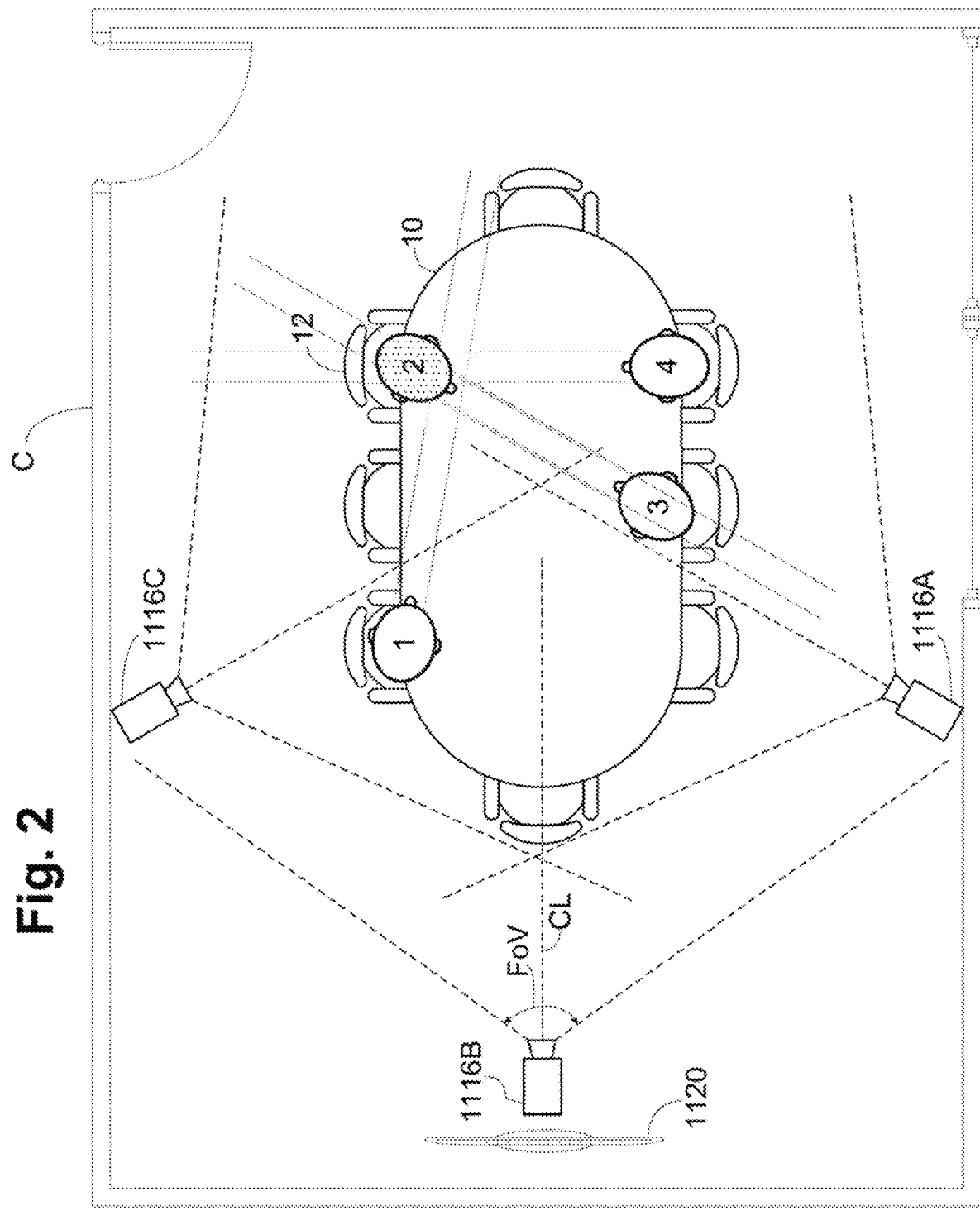
Figure 3:
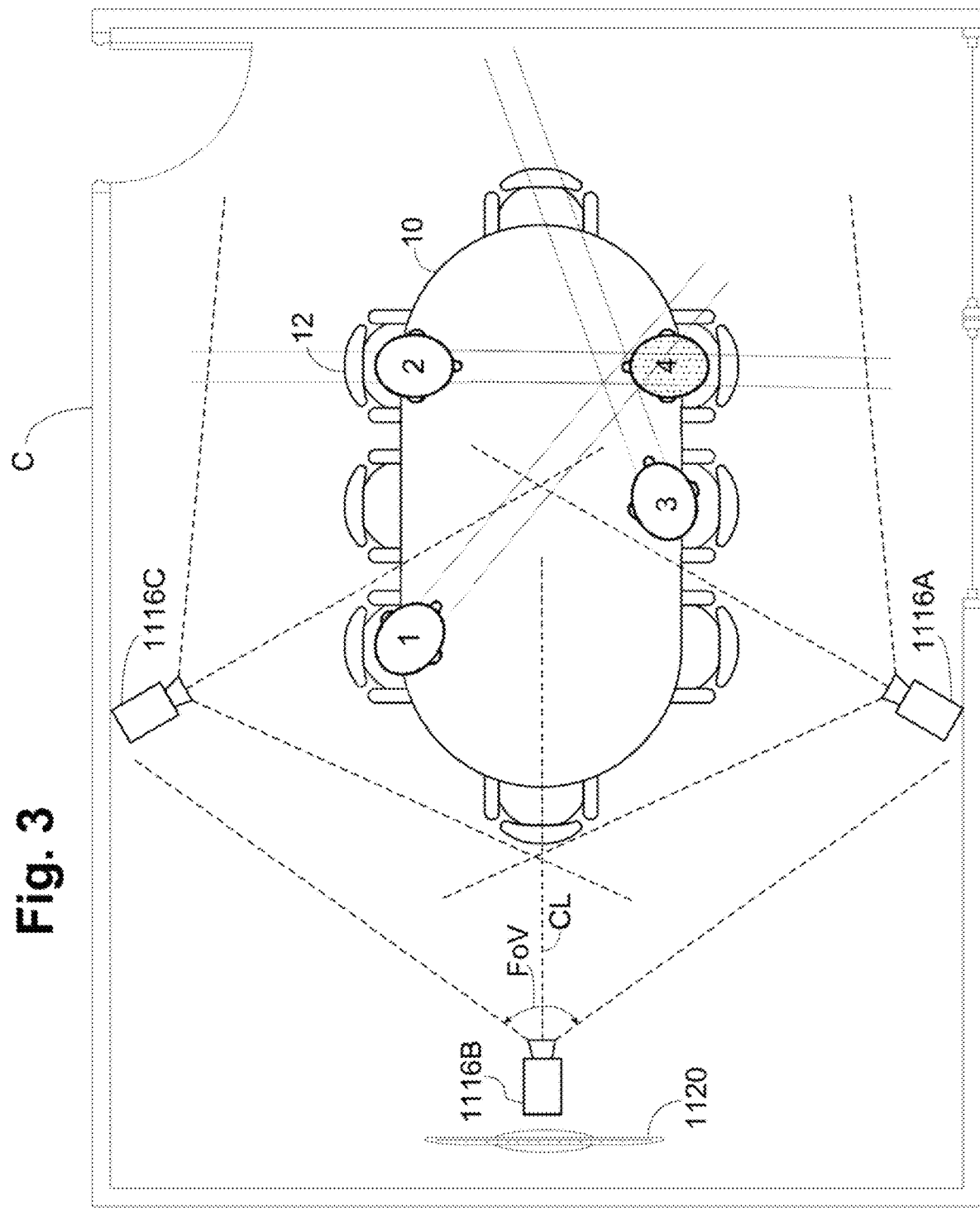
Figure 4:
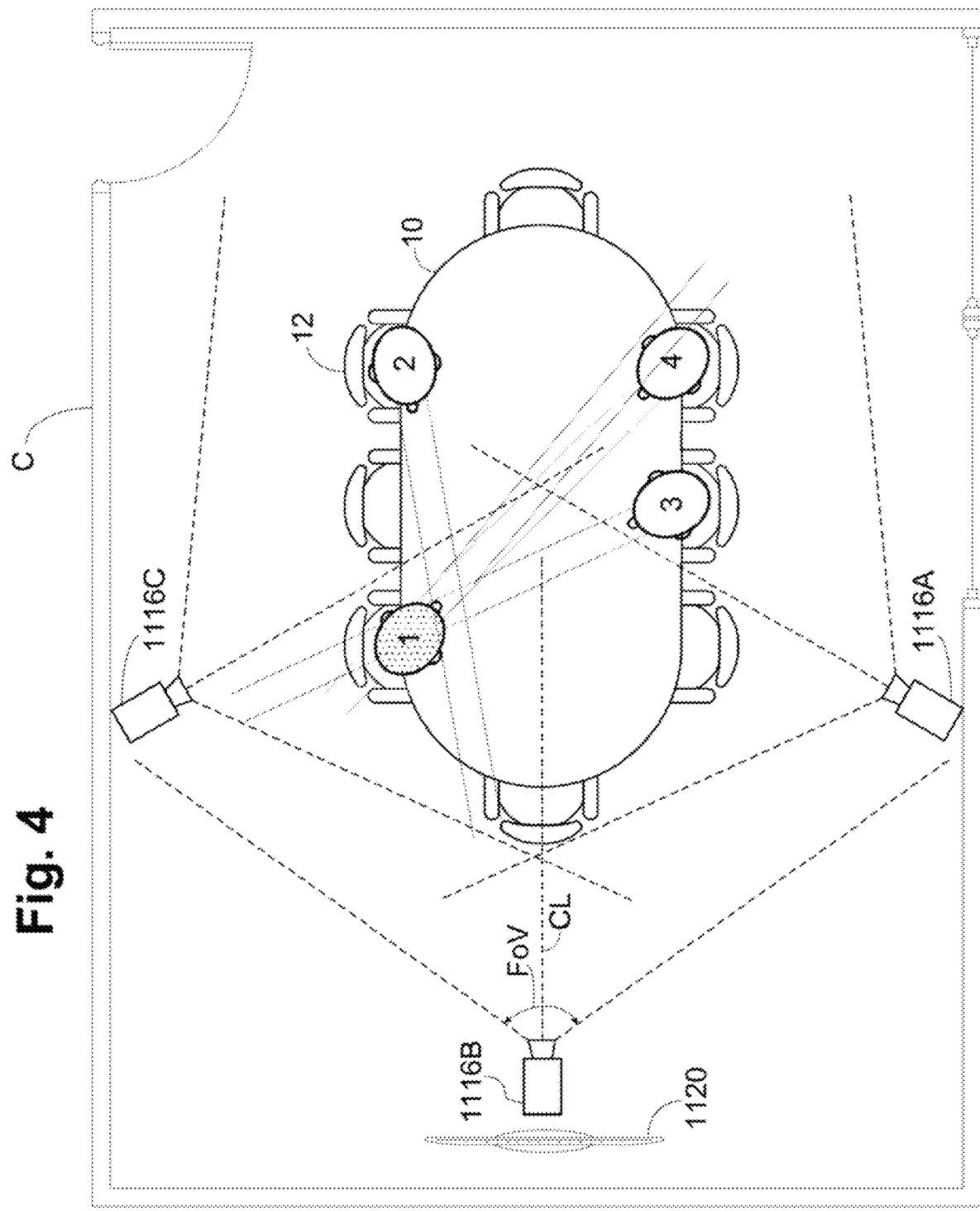
Figure 5:
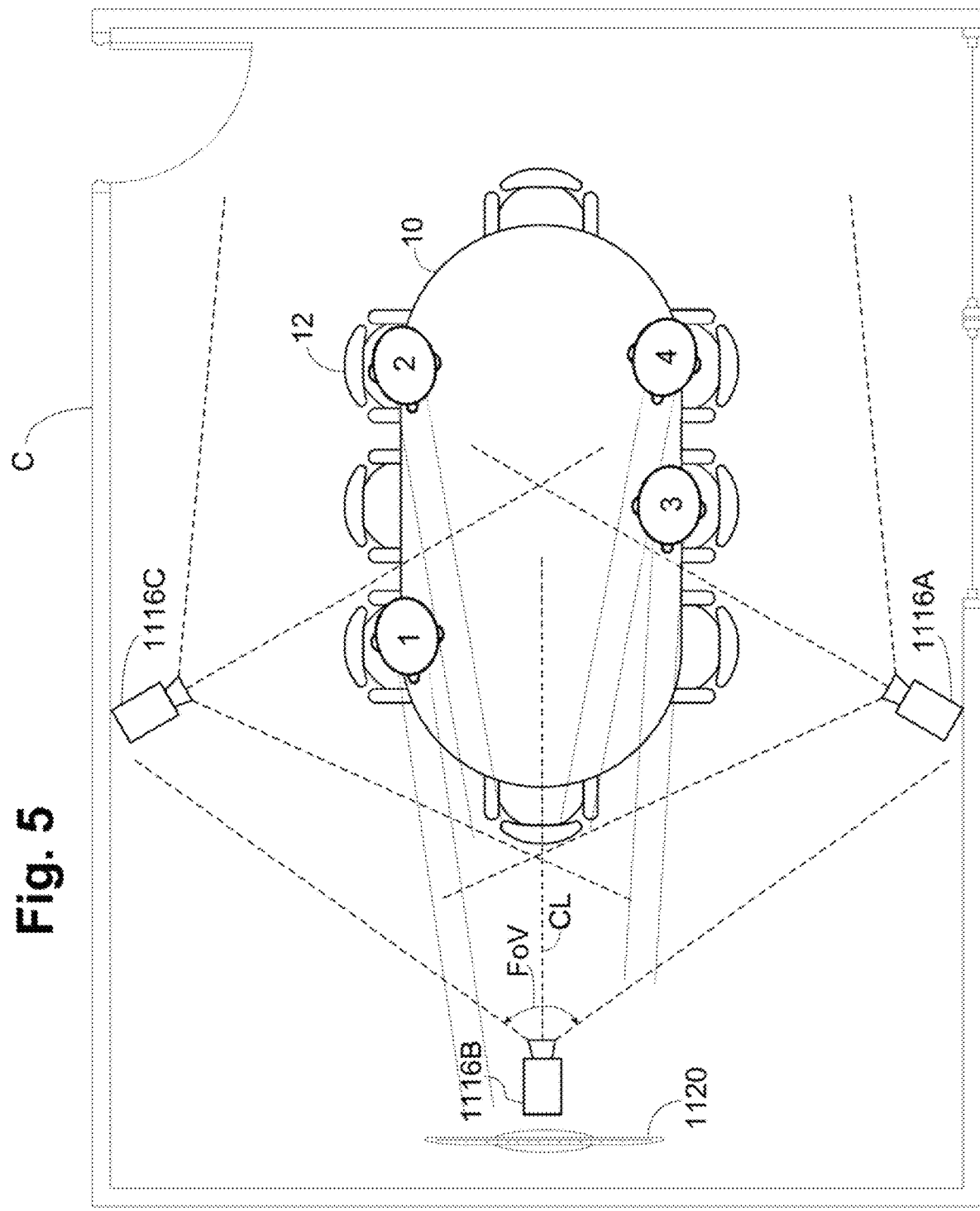

In FIG. 2, individual 2 has become the speaker and now individuals 1, 3 and 4 are facing individual 2. Camera 1116B has the best view of individual 2, as the view of individual 2 from camera 1116A is blocked by individual 3. In FIG. 3, individual 4 is now speaking and individuals 1, 2 and 3 are facing individual 4. Camera 1116C has a completely clear shot to the face of individual 4. Therefore, the video stream from camera 1116C is preferred to be transmitted to the far end. In FIG. 4, individual 1 is now speaking, with individuals 2, 3 and 4 facing individual 1. Cameras 1116B and 1116C both have poor views of individual 1, while camera 1116A has the best view of individual 1. In FIG. 5, none of the individuals in the conference room C are speaking but rather the far end is speaking, so all of the individuals 1, 2, 3, 4 are facing the monitor 1120. As no individuals in the conference room C are speaking, camera 1116B provides the best view of the entire room and therefore the video stream from camera 1116B is provided to the far end. If individual 3 is in a conversation with a speaker from the far end, all individuals 1, 2, 3, 4 may be facing the monitor 1120, but individual 3 is speaking. Camera 1116B will have the best view of individual 3's face, so a framed version of the individual 3's face is provided to the far end, as opposed to a view of the entire room when no individuals are speaking.

It is noted in FIGS. 1B-5 that each of the cameras 1116A, 1116B, 1116C can see all four individuals. This means that each of the cameras 1116A, 1116B, 1116C has the possibility of seeing the face of the speaking individual. To determine the particular individual that is speaking, the microphone array 1214 present on the primary camera 1116B is utilized with a sound source localization algorithm to determine the particular individual which is speaking. Pose information on the speaker is developed to allow matching to pose information developed on individuals captured by the cameras 1116A and 1116C. A candidate is selected from each camera 1116A, 1116B, 1116C and the version with the most frontal view is used to provide to the far end.

Figure 6:
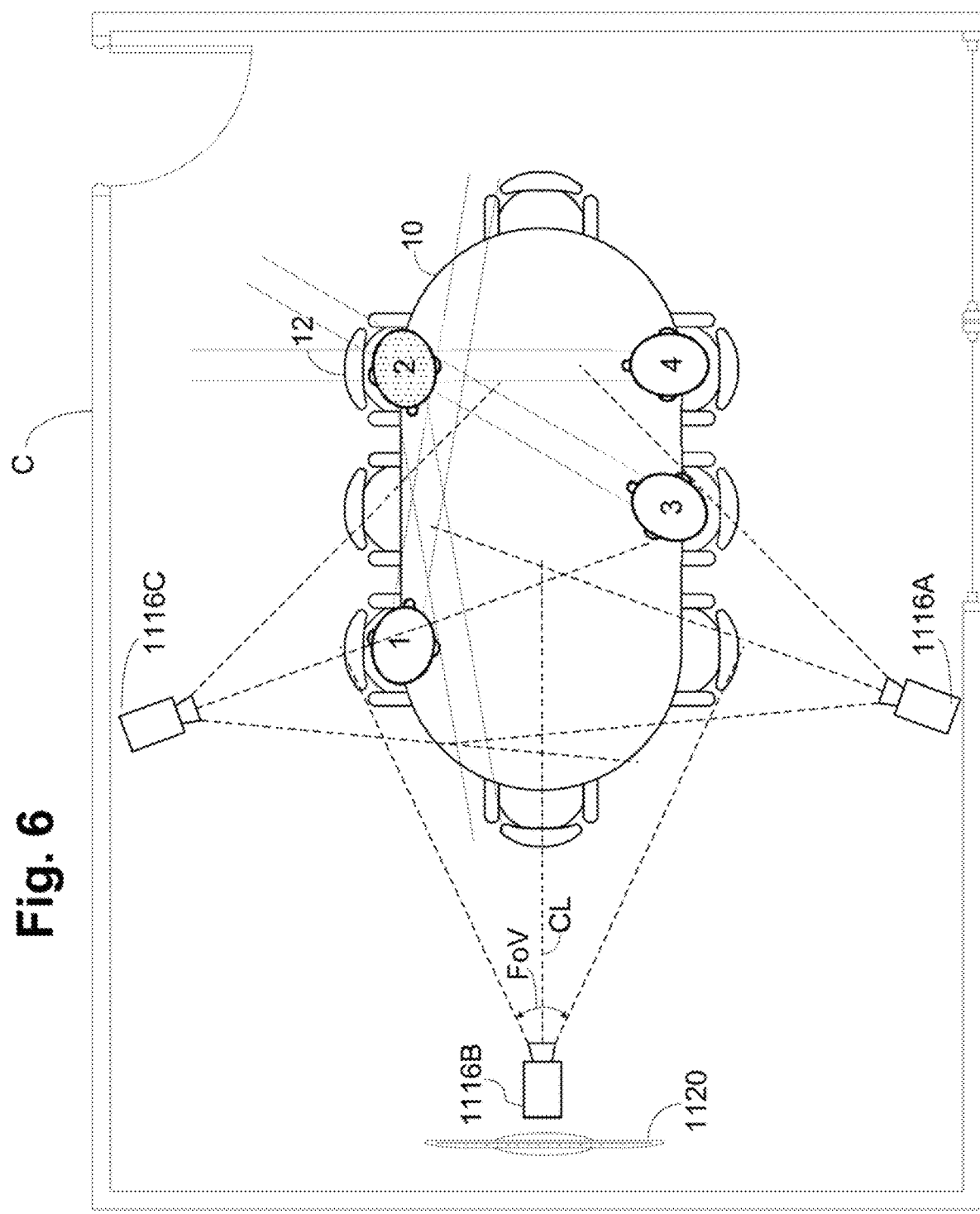
FIG. 6 is an illustration of the conference room of FIG. 0 with narrower camera angles, various individuals and one individual speaking.

In FIG. 6, it is noted that for certain implementations, the field-of-view (FOV) of the cameras 1116A, 1116B, 1116C is not as wide as that of FIG. 1B-5 so that not all of the individuals are necessarily in the field-of-view of any given camera. This reduced field-of-view limits selection of a camera to provide the video for transmission to the far end. The available field-of-view is used in the selection of the camera to provide the video for transmission to the far end. For example, individual 4 is not in the field-of-view of camera 1116A and individual 2 is not in the field-of-view of camera 1116C. If individual 2 is speaking, as shown in FIG. 6 by the highlighting of individual 2, the video from camera 1116C would not be utilized as it would not contain the speaker. As cameras 1116A and 1116B both have individual 2 in their fields-of-view, selection for a view of the face of the individual 2 is made from cameras 1116A or 1116B.

Figure 10:
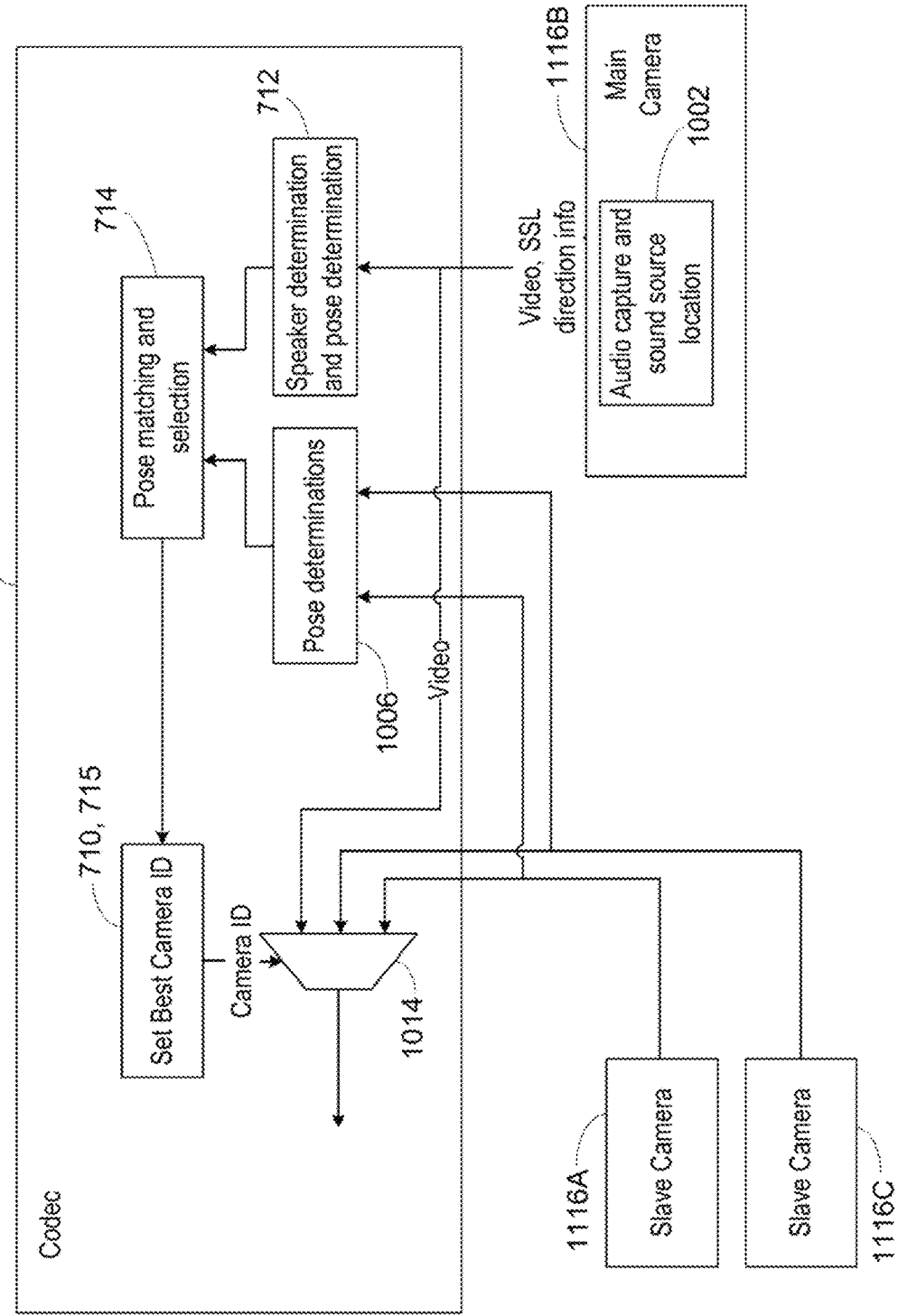
FIG. 10 is an illustration of division of operations between a codec and a camera according to an example of this disclosure.

In one example, the processing of the audio and video and selection of a desired camera is split between the primary camera 1116B and a codec 1100. Referring to FIG. 10, the primary camera 1116B performs sound source localization in step 1002 based on sound received at the microphone array 1214 and provides direction information. One example of performing SSL is provided in U.S. Pat. No. 6,912,178, which is hereby incorporated by reference. In step 712, an image from the primary camera 1116B video is processed by the codec 1100 to determine pose information of the speaker. This is preferably done using a neural network to provide pose boundaries, one for each individual in the image. The SSL direction information of step 1002 is combined with the pose boundaries to select the area of the camera image to be analyzed by a neural network to determine the detailed pose information or keypoints of the speaker. There are numerous variations of neural networks to determine the pose boundaries and the keypoints. The video streams of the cameras 1116A, 1116C are provided to the codec 1100 to perform pose determinations in step 1006 for each individual in each video stream. Preferably a neural network is used to develop pose information for each individual similar to that developed for the speaker. The pose information of the speaker and the individuals in the video streams of cameras 1116A and 1116C are compared in step 714 to determine the speaker in the video streams of cameras 1116A and 1116C. In step 710, the selected speaker video from each of the cameras 1116A, 1116B, 1116C are compared to determine which has the best frontal view of the speaker, which provides the best camera ID output. The video streams from each of the cameras 1116A, 1116B, 1116C are also provided to a multiplexer or switch 1014 in the codec 1100 for selection of the video to be provided to the far end based on the best camera ID value.

It is understood that the SSL determination, pose boundary determination and various pose information determinations are only performed periodically, not for every video frame, such as once every one second to once every five seconds in some examples. This is satisfactory as the speaker and the individual's location do not change much faster than those periods and because camera switching should not be performed rapidly to avoid disorienting the far end.

It is understood that pose boundary determinations and more detailed pose information of the speaker have been described as separate steps. Separate neural networks or a combined single neural network can be used to determine the pose boundaries and pose information. The development pose information of the individuals in the video streams of cameras 1116A, 1116C has been described as separate from the development of the pose information of the speaker. In some examples, the same neural network is used to determine the pose information, while in other examples different neural networks are used. In some examples, the pose information of the individuals in the video streams of cameras 1116A, 1116C can be done in two steps, the first developing pose boundaries of each individual and then developing detailed pose information of each identified individual. As with the speaker, a single neural network can be used to two separate neural networks can be used. In some examples, the neural networks are the same as used to determine the speaker in the video stream of the primary camera 1116B.

It is understood that the codec 1100 may perform framing operations on the video stream from the selected camera if desired, rather than providing the entire image from the selected camera. Additionally, the codec 1100 may provide video from other cameras based on framing considerations, such as if two individuals are having a conversation. The steps of FIG. 10 provide the information of the best camera to capture the speaker's face and that information is one input into framing and combining operations of the codec 1100, which are not shown.

In some examples the primary camera 1116B is built into the codec 1100, so the processing of the audio capture and SSL determination are performed by the codec 1100 rather than the camera 1116B.

FIG. 7 is a high-level flowchart of the best camera selection process. In step 702, it is determined if there is an active speaker. If not, in step 704, it is determined if there are individuals or attendees in the conference room or if the conference room is empty. If the conference room is empty, in step 706 a default camera ID is set, typically the primary camera 1116B. If there are attendees in the conference room, in step 708 the camera is chosen with the most frontal views of the attendees. In step 710, the determined best camera ID is set. If there is an active speaker in step 702, in step 712 the active speaker is located in the video of the primary camera 1116B and pose information of the speaker is developed. In step 714 the speaker pose information is matched to pose information of the individuals in each of the other camera 1116A, 1116C video streams. The best match is considered to be the speaker. In step 716 the two selected speaker views and the speaker view from the primary camera 1116B are compared for the best frontal view of the speaker.

In some examples the camera selections of steps 708 and 716 are performed using a keypoint method for facial keypoints. Keypoints are described more below with respect to FIG. 9. Pseudocode for the evaluation of steps 708 and 716 is provided in Table 1.

TABLE 1

```
cameraScore=0;
// find active speaker pose ID
    activeSpeakerPoseID = −1;
    if (audioSSLPos != −1) {
        for (pose : cameraPoseList) {
            compute left and right line for this pose (by going through its keypoints)
            if (audioSSLPos >= left && audioSSLPos <= right) {
                activeSpeakerPoseID = pose.id;
                break;
            }
        }
    }
    for (pose : cameraPoseList) {
        poseScore=0;
```

TABLE 1-continued

```
    sum = Sum score for 5 facial keypoints (nose, left/right eye, left/right ear)
    if (sum > THRESHOLD)
        poseScore=4*noseScore+2*min(leftEyeScore,rightEyeScore)+
min(leftEarScore,rightEarScore);
        if ((activeSpeakerPoseID == -1) || (activeSpeakerPoseID == pose.id))
        cameraScore += poseScore;
    }
```

In one example, THRESHOLD is set at 2.5, so that a poseScore is computed when the possibility of a face is higher than 50%. Different weights are used for each facial keypoint as some keypoints, such as the nose, are more important. When there is an active speaker, the cameraScore is the active speaker poseScore. When there is no active speaker, the cameraScore is the sum of the poseScores for each face in the camera image. For both steps 708 and 716, the highest cameraScore is the selected camera.

In some examples, because distances from the cameras vary and camera settings vary, various correction factors are applied to each poseScore. Each poseScore as computed above is multiplied by a sizescaleFactor and a brightness ScaleFactor. sizeScaleFactor is computed by comparing the face bounding box of two poses. brightnessScaleFactor is computed by comparing the average luminance level of corresponding face bounding box of two poses. sizeScaleFactor=(pose1FaceBoundingBoxArea/pose2FaceBoundingBoxArea); brightnessScaleFactor= (pose1FaceBoundingBoxBrightness/pose2FaceBoundingBoxBrightness). Other normalization methods can be applied in calculation of poseScore.

Referring to FIG. 8, the location determination of the speaker and development of the pose information of step 712 is detailed. In step 802 the audio SSL information is obtained. In step 804 the audio SSL information is converted to a horizontal coordinate in the field of view of the primary camera 1116B. In step 806 the active poses of each individual in the video stream are determined. In one example, detailed pose information, such as keypoints, described in more detail below, is developed for each individual. The detailed pose information is reviewed to determine the left and right limits or boundaries for each individual. In many examples a neural network is used to develop the detailed pose information. These boundaries are shown as dashed lines in the image of FIG. 9A. In another example, the pose boundaries are developed, as well as detailed pose information on each individual, by a neural network. In step 808 the horizontal coordinate, shown as the solid line in FIG. 9A, is compared to the pose boundaries developed in step 806. This allows the setting of the best pose ID, the pose ID of the speaker, with its detailed pose information, in step 810.

Figure 9:
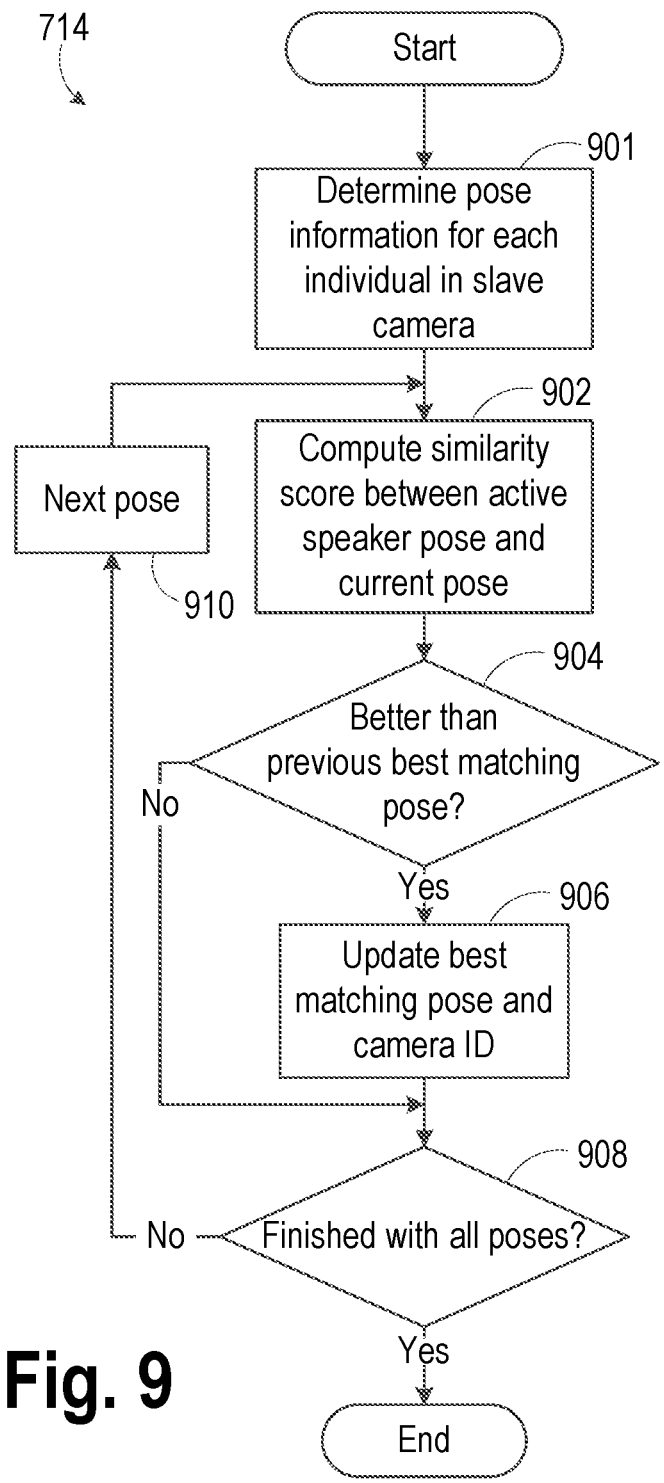
FIG. 9 is a flowchart of operation of the pose matching and best camera selection step of FIG. 7 according to an example of this disclosure.
Figure 9B:
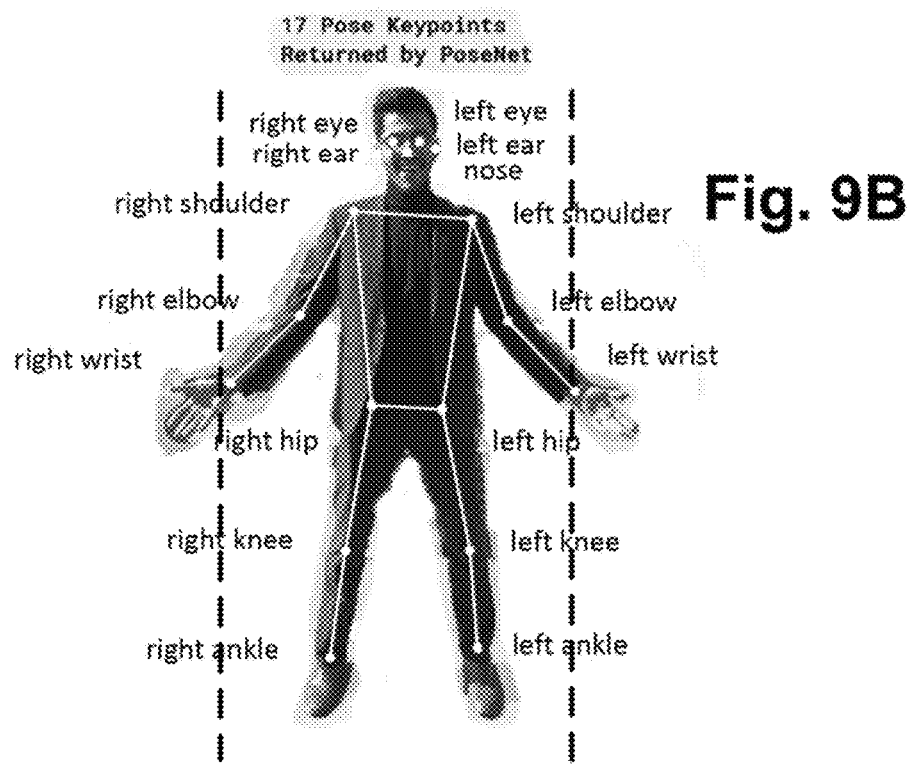
FIG. 9B is an illustration of keypoints used in the pose determination and pose matching steps according to an example of this disclosure.
Figure 9A:
FIG. 9A is an illustration of audio SSL position and pose boundaries according to an example of this disclosure.

Referring to FIG. 9, the matching of poses of individuals in the video streams of cameras 1116A, 1116C to the speaker pose of step 714 is detailed. In step 901, the pose information for each individual detected in each camera 111A, 1116C is determined. As with the speaker determination of the primary camera 1116B, in many examples a neural network is used to develop keypoints or similar detailed pose information. Exemplary keypoints are illustrated in FIG. 9B. In step 902 a similarity score between the active speaker pose information and current pose information is developed.

For each keypoint, there is score and position information. The higher the score, the more likely the feature is present. For example, if the nose score is 0.99, then the possibility of the nose feature is 99%. The two dashed lines in FIG. 9B are the left and right boundaries of the illustrated pose.

There are many possible methods to compute a similarity score between two poses, such as:

Segmentation Method: A segmentation model is applied to the images from each camera 1116A, 1116B, 1116C and a segmentation map is developed for each pose. Feature vectors are extracted from the segmented poses, and the feature vectors are compared. For feature vector calculation, there are a number of vectors that can be used. One example uses Face-Abdomen vectors. These vectors include values for face and abdominal features such as:

Hair Height (HH): Distance between topmost hair pixel and topmost forehead pixel.
Ear Height (ERH): Distance between topmost and bottom most ear pixels.
Eye Height (EYH): Distance between topmost and bottom most eye pixels.
Nose Height (NH): (same as above).
Torso Height (TRH): Distance in pixels from bottom most neck pixel to waist pixels
Torso Color (TC): Color of the clothing being worn.
Skin Color (SC).

Scale factors and lens distortions from every camera are used to normalize these values across multiple cameras.

The above values are then considered with priorities by assigning weights to them. The weights can be as follows:
HH: 5, ERH: 4, EYH: 2, NH: 5, TRH: 8, TC: 9, SC: 9
The vector is then computed as follows:
[HH*5, ERH*4, EYH*2, NH*5, TRH*8, TC*9, SC*9]

It can be seen that torso height and color and skin color have been allocated higher importance. Multiple vectors can be computed for each person over time with one vector per frame. To identify similarity between poses and people from multiple cameras, the similarity between these vectors is computed. In one example, simple Euclidean distance is used as a measure to compute the similarity.

Keypoint Method: As shown in FIG. 9B, typically there are 17 total keypoints. A keypoint similarity score is computed for a small region around each keypoint and the keypoint similarity scores are summed for a total similarity score. In one example, to compute a keypoint similarity score, an 8×8 block around the keypoint is used for the similarity score computation, using values such as color histogram, dct coefficients, and the like for 8×8 block. In one example, only keypoints with values over 0.3 are used to evaluate similarity. If the total similarity score is more than four, it is an accepted similarity score and the pose is used in comparing poses. If the total similarity score is less than four, that pose is not used in comparing poses and is ignored.

Using FIG. 9A as an example, the speaker is individual 1 on the left. The segmentation map or keypoints for the speaker in the primary camera 1116B are determined. Pose information is developed for each of three individuals in the camera 1116A stream. A matching or similarity score is developed for the pose information of each individual and the speaker pose information from primary camera 1116B.

Using the segmentation method, the similarity score is between the segmentation maps. In the keypoint method, the similarity score is between the total similarity scores. For example, the similarity score between camera 1116B speaker pose information and camera 1116A individual two (center individual) pose information might be 30. The similarity score between camera 1116B speaker pose information and camera 1116A individual one pose information might be 90. The similarity score between camera 1116B speaker pose information and camera 1116A individual three (right individual) pose information might be 25. The highest similarity score is the 90 between the speaker and individual one. So individual one is selected as the speaker in the view of camera 1116A. The same process is used for camera 1116C.

After the similarity score is determined in step 902, in step 904 that similarity score is compared to the previous best similarity score. If higher, better, in step 906 the similarity score and individual is updated. If not higher in step 904 or after updating in step 906, it is determined if the last pose of all cameras has been evaluated. If not, in step 910 the next pose information is selected, and step 902 is performed on that pose information. If all of the poses have been evaluated, the best matching individual, and related pose information, for each camera has been determined and that individual is used in the frontal view comparison of step 715. The best frontal view determination can use the keypoints or vectors used in the matching process.

Figure 11:
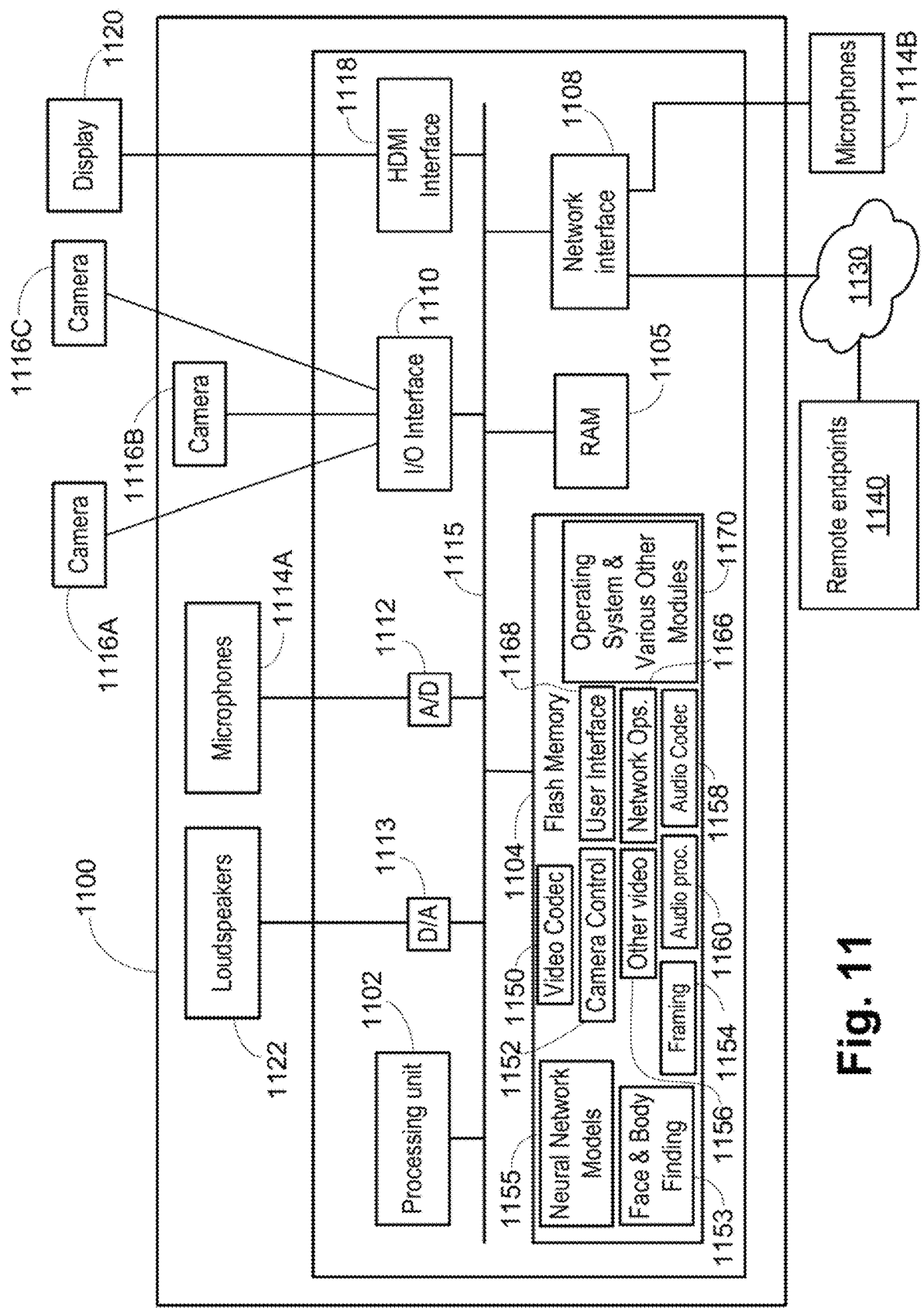
FIG. 11 is a block diagram of a codec according to an example of this disclosure.

FIG. 11 illustrates aspects of a codec 1100 in accordance with an example of this disclosure. The codec 1100 may include loudspeaker(s) 1122, though in many cases the loudspeaker 1122 is provided in the monitor 1120, and microphone(s) 1114A interfaced via interfaces to a bus 1115, the microphones 1114A through an analog to digital (A/D) converter 1112 and the loudspeaker 1122 through a digital to analog (D/A) converter 1113. The codec 1100 also includes a processing unit 1102, a network interface 1108, a flash memory 1104, RAM 1105, and an input/output (I/O) general interface 1110, all coupled by bus 1115. The camera(s) 1116A, 1116B, 1116C are illustrated as connected to the I/O interface 1110. Microphone(s) 1114B are connected to the network interface 1108. An HDMI interface 1118 is connected to the bus 1115 and to the external display or monitor 1120. Bus 1115 is illustrative and any interconnect between the elements can used, such as Peripheral Component Interconnect Express (PCIe) links and switches, Universal Serial Bus (USB) links and hubs, and combinations thereof. The cameras 1116A, 1116B, 1116C and microphones 1114A, 1114B can be contained in housings containing the other components or can be external and removable, connected by wired or wireless connections, or camera 1116B can be built into the codec 1100. In some examples, the primary camera 1116B can be built into the codec 1100, with this example shown in FIG. 11.

The processing unit 1102 can include digital signal processors (DSPs), central processing units (CPUs), graphics processing units (GPUs), dedicated hardware elements, such as neural network accelerators and hardware codecs, and the like in any desired combination.

The flash memory 1104 stores modules of varying functionality in the form of software and firmware, generically programs, for controlling the codec 1100. Illustrated modules include a video codec 1150, camera control 1152, face and body finding 1153, neural network models 1155, framing 1154, other video processing 1156, audio codec 1158, audio processing 1160, network operations 1166, user interface 1168 and operating system and various other modules 1170. The RAM 1105 is used for storing any of the modules in the flash memory 1104 when the module is executing, storing video images of video streams and audio samples of audio streams and can be used for scratchpad operation of the processing unit 1102. The face and body finding 1153 and neural network models 1155 are used in the various operations of the codec 1100, such as the face detection step 1004, the pose determination step 1006, the object detection step 802 and the depth/distance estimation step 806. This depth/distance estimation is preferably performed using a neural network on the cameras in the bounding boxes, though other techniques may be used. A depth value z results, so that now the x, y, z coordinates of each camera in relation to the primary camera are known. In step 808, these coordinates are matched to a camera identification to provide the entry into a camera table. These coordinates are used with the facial pose information to determine the best camera to view the face of the speaker The network interface 1108 enables communications between the codec 1100 and other devices and can be wired, wireless or a combination. In one example, the network interface 1108 is connected or coupled to the Internet 1130 to communicate with remote endpoints 1140 in a videoconference. In one or more examples, the general interface 1110 provides data transmission with local devices such as a keyboard, mouse, printer, projector, display, external loudspeakers, additional cameras, and microphone pods, etc.

In one example, the cameras 1116A, 1116B, 1116C and the microphones 1114 capture video and audio, respectively, in the videoconference environment and produce video and audio streams or signals transmitted through the bus 1115 to the processing unit 1102. In at least one example of this disclosure, the processing unit 1102 processes the video and audio using algorithms in the modules stored in the flash memory 1104. Processed audio and video streams can be sent to and received from remote devices coupled to network interface 1108 and devices coupled to general interface 1110. This is just one example of the configuration of a codec 1100.

Figure 12:
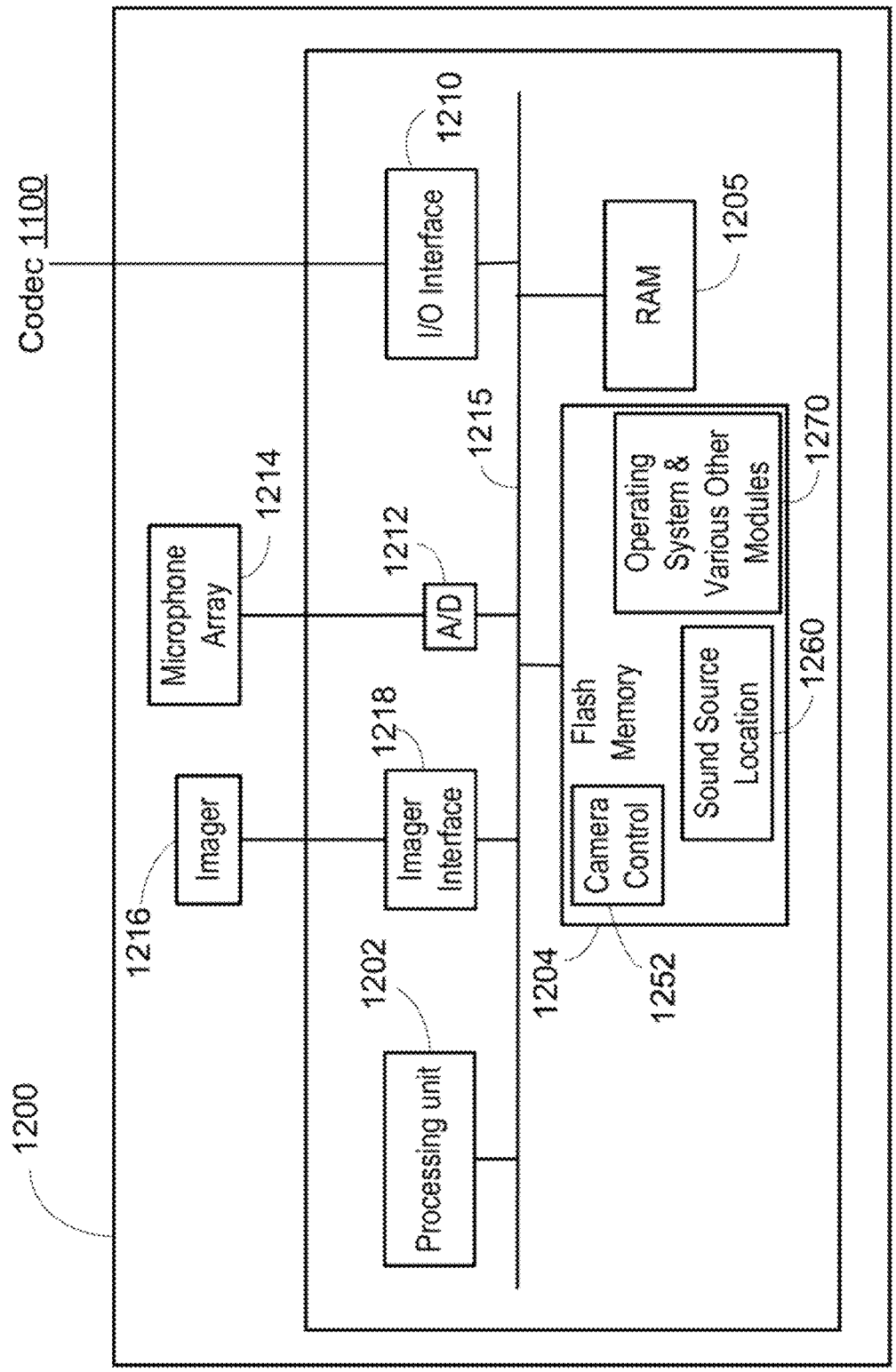
FIG. 12 is a block diagram of a camera according to an example of this disclosure.

FIG. 12 illustrates aspects of a camera 1200 that is separate from the codec 1100, in accordance with an example of this disclosure. The camera 1200 includes an imager or sensor 1216 and a microphone array 1214 interfaced via interfaces to a bus 1215, the microphone array 1214 through an analog to digital (A/D) converter 1212 and the imager 1216 through an imager interface 1218. The camera 1200 also includes a processing unit 1202, a flash memory 1204, RAM 1205, and an input/output general interface 1210, all coupled by bus 1215. Bus 1215 is illustrative and any interconnect between the elements can used, such as Peripheral Component Interconnect Express (PCIe) links and switches, Universal Serial Bus (USB) links and hubs, and combinations thereof. The codec 1100 is connected to the I/O interface 1210, preferably using a USB interface.

The processing unit 1202 can include digital signal processors (DSPs), central processing units (CPUs), graphics processing units (GPUs), dedicated hardware elements, such as neural network accelerators and hardware codecs, and the like in any desired combination.

The flash memory 1204 stores modules of varying functionality in the form of software and firmware, generically programs, for controlling the camera 1200. Illustrated modules include camera control 1252, sound source localization 1260 and operating system and various other modules 1270. The RAM 1205 is used for storing any of the modules in the flash memory 1204 when the module is executing, storing video images of video streams and audio samples of audio streams and can be used for scratchpad operation of the processing unit 1202.

In a second configuration, only the primary camera 1116B includes the microphone array 1214 and the sound source location module 1260. Cameras 1116A, 1116C are then just simple cameras. In a third configuration, the primary camera 1116B is built into the codec 1100, so that the processing unit 1202, the flash memory 1204, RAM 1205 and I/O interface 1210 are those of the codec 1100, with the imager interface 1218 and A/D 1212 connected to the bus 1115.

Other configurations, with differing components and arrangement of components, are well known for both videoconferencing endpoints and for devices used in other manners.

Figure 13:
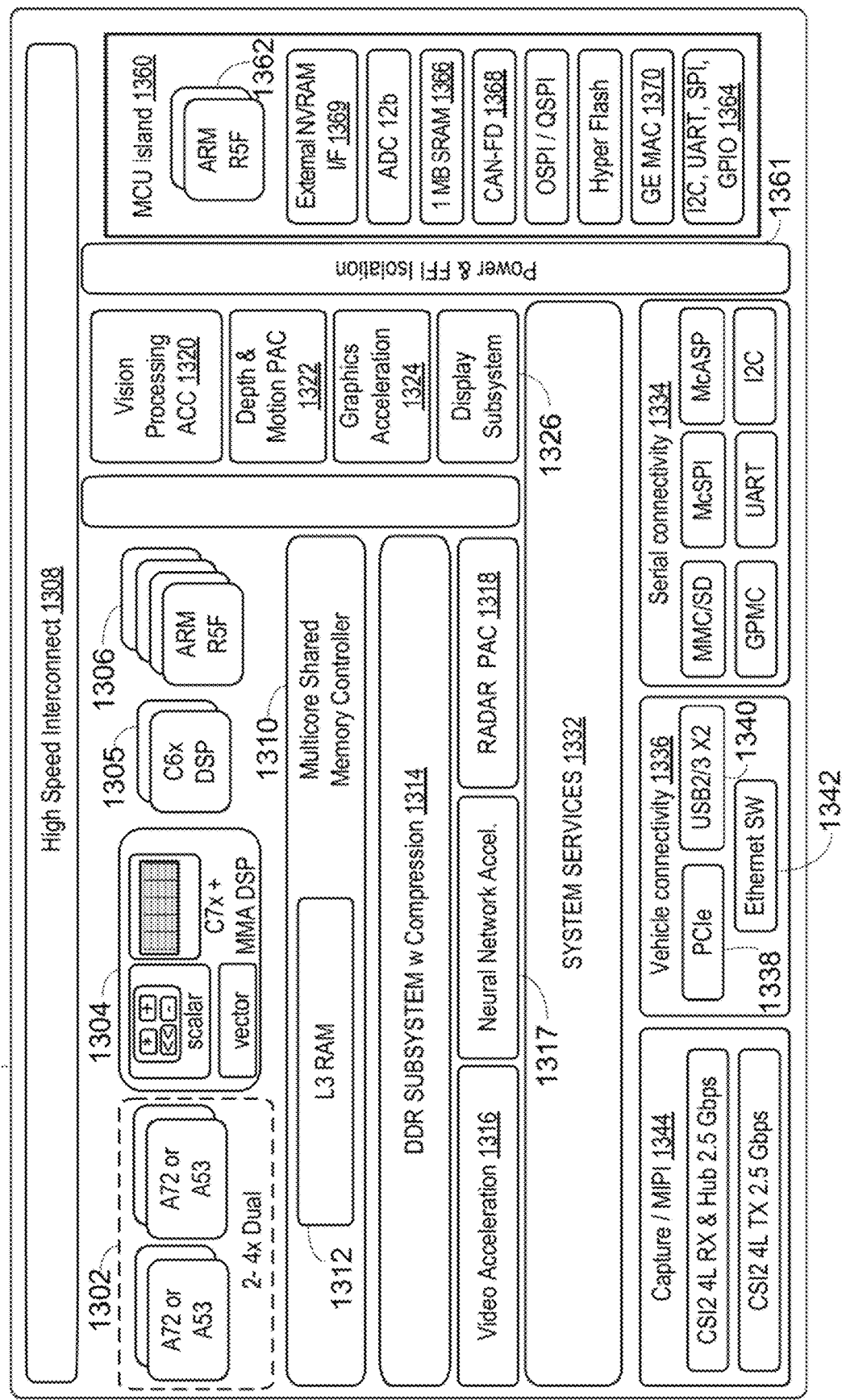
FIG. 13 is a block diagram of the processor units of FIGS. 11 and 12.

FIG. 13 is a block diagram of an exemplary system on a chip (SoC) 1300 as can be used as the processing unit 1102 or 1202. A series of more powerful microprocessors 1302, such as ARM® A72 or A53 cores, form the primary general-purpose processing block of the SoC 1300, while a more powerful digital signal processor (DSP) 1304 and multiple less powerful DSPs 1305 provide specialized computing capabilities. A simpler processor 1306, such as ARM R5F cores, provides general control capability in the SoC 1300. The more powerful microprocessors 1302, more powerful DSP 1304, less powerful DSPs 1305 and simpler processor 1306 each include various data and instruction caches, such as L1I, L1D, and L2D, to improve speed of operations. A high-speed interconnect 1308 connects the microprocessors 1302, more powerful DSP 1304, simpler DSPs 1305 and processors 1306 to various other components in the SoC 1300. For example, a shared memory controller 1310, which includes onboard memory or SRAM 1312, is connected to the high-speed interconnect 1308 to act as the onboard SRAM for the SoC 1300. A DDR (double data rate) memory controller system 1314 is connected to the high-speed interconnect 1308 and acts as an external interface to external DRAM memory. The RAM 1105 or 1205 are formed by the SRAM 1312 and external DRAM memory. A video acceleration module 1316 and a radar processing accelerator (PAC) module 1318 are similarly connected to the high-speed interconnect 1308. A neural network acceleration module 1317 is provided for hardware acceleration of neural network operations. A vision processing accelerator (VPACC) module 1320 is connected to the high-speed interconnect 1308, as is a depth and motion PAC (DMPAC) module 1322.

A graphics acceleration module 1324 is connected to the high-speed interconnect 1308. A display subsystem 1326 is connected to the high-speed interconnect 1308 to allow operation with and connection to various video monitors. A system services block 1332, which includes items such as DMA controllers, memory management units, general-purpose I/O's, mailboxes and the like, is provided for normal SoC 1300 operation. A serial connectivity module 1334 is connected to the high-speed interconnect 1308 and includes modules as normal in an SoC. A vehicle connectivity module 1336 provides interconnects for external communication interfaces, such as PCIe block 1338, USB block 1340 and an Ethernet switch 1342. A capture/MIPI module 1344 includes a four-lane CSI-2 compliant transmit block 1346 and a four-lane CSI-2 receive module and hub.

An MCU island 1360 is provided as a secondary subsystem and handles operation of the integrated SoC 1300 when the other components are powered down to save energy. An MCU ARM processor 1362, such as one or more ARM R5F cores, operates as a master and is coupled to the high-speed interconnect 1308 through an isolation interface 1361. An MCU general purpose I/O (GPIO) block 1364 operates as a secondary. MCU RAM 1366 is provided to act as local memory for the MCU ARM processor 1362. A CAN bus block 1368, an additional external communication interface, is connected to allow operation with a conventional CAN bus environment in a vehicle. An Ethernet MAC (media access control) block 1370 is provided for further connectivity. External memory, generally non-volatile memory (NVM) such as flash memory 104, is connected to the MCU ARM processor 1362 via an external memory interface 1369 to store instructions loaded into the various other memories for execution by the various appropriate processors. The MCU ARM processor 1362 operates as a safety processor, monitoring operations of the SoC 1300 to ensure proper operation of the SoC 1300.

It is understood that this is one example of an SoC provided for explanation and many other SoC examples are possible, with varying numbers of processors, DSPs, accelerators and the like.

Figure 14:
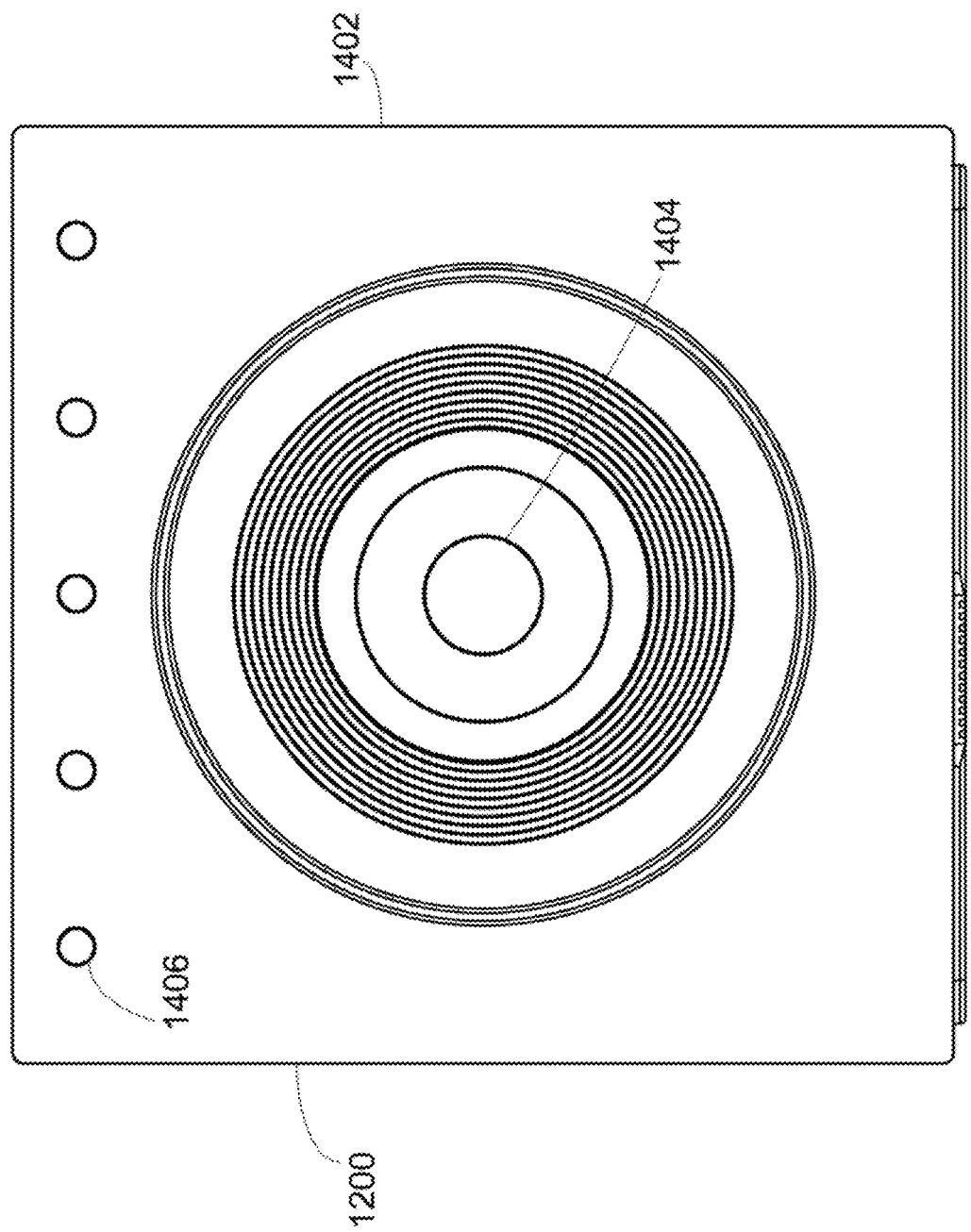
FIG. 14 is an illustration of the front view of a camera according to an example of this disclosure.

FIG. 14 provides a front view of a camera 1200, such as the camera 1116B and, optionally, the cameras 1116A and 1116C. The camera 1200 is a housing 1402 with a lens 1404 provided in the center to operate with the imager 1216. A series of five openings 1406 are provided as ports to the microphones in the microphone array 1214. It is noted that the microphone openings 1406 form a horizontal line to provide the desired angular determination for the sound source localization algorithm. This is an exemplary illustration of a camera 1200 and numerous other configurations are possible, with varying lens and microphone configurations.

Implementations described above, discuss determining an active speaker's best view. It is also contemplated that that in certain implementations, the best view of individuals or participants in a conference room are also determined at any given time, regardless of whether an individual is an active speaker or not.

In various implementations, a single stream video composition is provided to the far end conference site or sites (i.e., far end as described above). As further described herein, a best view of each of the individuals or participants in the conference room is taken, and a composite of the views is provided.

For example, in conference room with one camera, wherein the camera is implemented in a device such as video bar as described above, six individuals or participants enter the conference room. A composited video stream of the six individuals or participants is sent or fed to the far end. Implementations further provide for multiple streams to be provided, as well as the use of more than one (i.e., multiple cameras), where the best view from the best camera of the individuals or participants is used. As further described below, various embodiments provide for a production module to perform such functions.

Various described implementations above provide that where one or more cameras (i.e., multiple cameras) are used, the multi-camera selection algorithm provides that secondary cameras do not implement the described machine learning features that implement neural networks, and are considered as "dumb" secondary cameras. Only the primary camera implements the described machine learning that includes neural networks. For example, implementations include third party USB cameras as "dumb" secondary cameras. As discussed, in various embodiments, the primary camera can be a video bar, pan-tilt zoom cameras or other type of camera. Implementations further provide that such cameras be connected to connect to a computing device, such as a codec.

In the following implementations, all of the plurality of cameras implement the use of machine learning. In various implementations, a checking camera operation is performed. The checking camera operation is implemented to monitor a chosen camera and determine if the chosen camera, as identified camera ID, is no longer the best camera option to perform video streaming. If not, a new best camera, with new camera ID, is found as described above.

Implementations provide that over a certain time period (e.g., 1 or 2 seconds), determined facial keypoints and sound levels of the chosen camera are checked as described in FIG. 9. The chosen camera is identified by a default camera ID. If the results from checking the facial keypoints and sound levels indicate detection of facial keypoints and sound levels, there is an indication that one or more individuals or participants are in the view of the chosen camera. Then the best camera operations are performed as described herein. If the checking results indicate that there are no individuals or participants in the view of the chosen camera, the chosen camera and its default camera ID are kept.

Implementations further provide a determination of a front view of a speaker as described in FIG. 9 above. A determination is performed as to the checked facial keypoints and sound levels of the chosen camera. If the results of the checked facial keypoints and sound levels of the chosen camera indicate a front view, then the chosen camera continues to be used. If the checking results indicate no detection of a front view, the best camera operations are performed as described herein.

It is contemplated that in other implementations, such secondary cameras implement machine learning as described herein, including face detection, pose detection, etc.

Figure 15A:
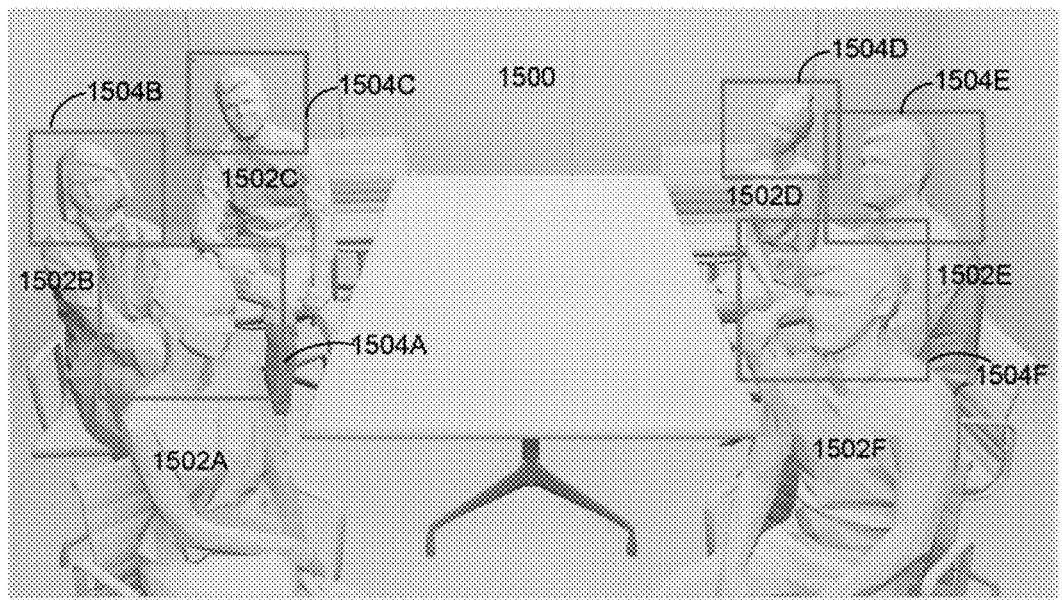
FIG. 15A is an illustration of a conference room that includes six individuals or participants and their best views in a multi camera system.
Figure 15B:
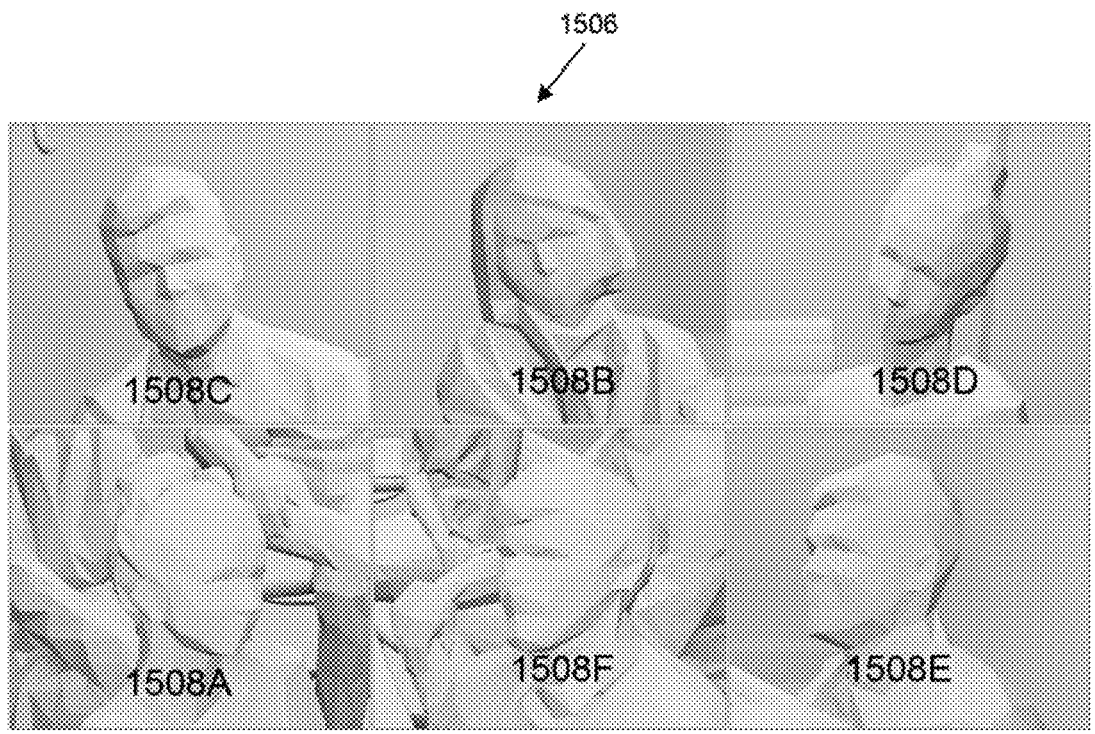
FIG. 15B is an illustration of a composite picture of individual best views.

FIGS. 15A and 15B illustrate a framing example with multiple secondary cameras that implement machine learning features. In particular, such secondary cameras implement machine learning to find the faces of the individuals or participants with the best frontal view and send a framed face rectangle information with meta data to a primary camera. The primary camera includes a central control logic to create a single stream with the best overall composition of all rectangles from all cameras.

FIG. 15A illustrates a conference room 1500 that includes six individuals or participants, 1502A, 1502B, 1502C, 1502D, 1502E, 1502F. Each of the participants or individuals 1502 are processed with framed face rectangle information as represented by respective bounding boxes 1504A, 1504B, 1504C, 1504D, 1504E, 1504F.

FIG. 15B illustrates a composite picture 1506 of individual best views 1508. of the participant or individuals 1500, as defined by their respective bounding boxes 1504. In specific, the composite picture 1506 includes best views 1508A, 1508B, 1508C, 1508D, 1508E, 1508F. Implementations provide for the composed picture 1506 to be sent from the primary camera to the far end.

Figure 16:
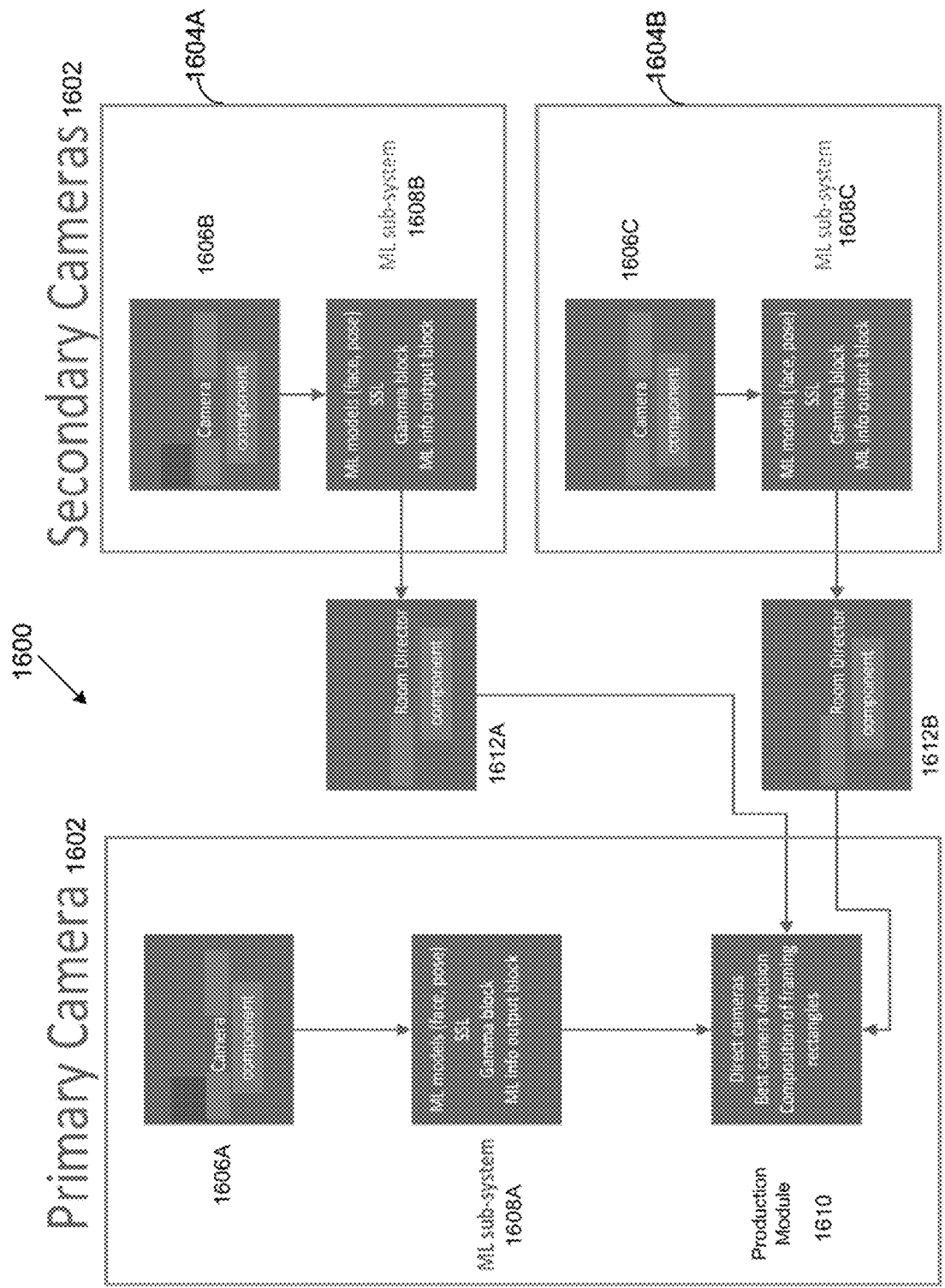
FIG. 16 is an illustration of a multi-camera system to provide a composite picture of best views of individuals or participants.

FIG. 16 illustrates a multi-camera system 1600 to provide composite of best views of individuals or participants. In this example the multi-camera system 1600 includes a primary camera 1602 and secondary cameras 1604A and 1604B. Various embodiments provide that cameras 1602 and 1604 are implemented as the camera 1200 described in FIG. 12. Implementations provide for the elements described in FIG. 16 to be further included in the camera 1200 of FIG. 12. The cameras 1604A and 1604 include machine learning features as described herein.

Implementations provide for each of the cameras 1604A and 1604 to include respective camera components 1606A, 1606B, and 1606C. Implementations also provide each of the cameras 1604A and 1604 to include respective machine learning (ML) sub-systems 1608A, 1608B, and 1608C.

The respective camera components 1606 sends video frames to their respective ML subsystems 1608. The ML subsystems 1608 implements the described ML models for face and pose detection, SSL feed ML output to a Gamma block and sends filtered output from Gamma block as described above to a production module 1610 of primary camera 1602. The Gamma block filters the ML bounding boxes described in FIG. 15A, with motion and timing logic to reduce false positives and negatives. Implementations provide for respective room director components 1612A and 1612B to support secondary camera 1604A and 1604B. In particular, room director component 1612A sends output from Gamma block of ML subsystem 1608A to production module 1610, and room director component 1612B sends output from Gamma block of ML subsystem 1608B to production module 1610.

Implementations provide for the production module 1610 to be a central processing unit. The production module 1610 determines best camera selection and composition of all framing rectangles into a proper frame to be send to the far side.

Implementations provide for a machine learning-based approach for automatic re-identification of the individuals or participants across multiple cameras of multi-camera system 1600. In such implementations, the same individual or participant receives an identical identifier across the multiple cameras.

The production module 1610 receives bounding box, feature vector, poses, and SSL for the detected faces of individuals or participants. Re-identification is performed through, for example, cosine distance matching of feature vectors. Pose information is used to find the best frontal view of participants. SSL, as described above, can be used to find the active speaker. The production module 1610 combines individual or participant identification, best frontal view, and active speaker to perform determination as to the best camera selection and composition of framing for the far side. For certain implementations, if there is an active speaker, the best frontal view of active speaker is shown. If no such active speaker, the best frontal view of each participant or the whole group is shown.

While the above description has used a conference room as the exemplary environment, the environment can be any setting where multiple cameras can provide different views of a group of individuals.

While the above description has used three cameras as an example, it is understood that different numbers of cameras can be utilized from two to a limit depending on the processing capabilities and the particular environment. For example, in a larger venue with more varied seating, more cameras may be necessary to cover all individuals that may speak.

While the above description had the camera selection being performed in a codec, it is understood that different items can perform the camera selection. In one example, one camera of the number of cameras can be selected to perform the camera selection and to interact with the other cameras to control the provision of video streams from the cameras. In another example, a separate video mixing unit can perform the camera selection and other video processing and the codec can simply encode the selected camera video stream.

The various examples described are provided by way of illustration and should not be construed to limit the scope of the disclosure. Various modifications and changes can be made to the principles and examples described herein without departing from the scope of the disclosure and without departing from the claims which follow.

Computer program instructions may be stored in a non-transitory processor readable memory that can direct a computer or other programmable data processing apparatus, processor or processors, to function in a particular manner, such that the instructions stored in the non-transitory processor readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only and are not exhaustive of the scope of the invention.

Consequently, the invention is intended to be limited only by the spirit and scope of the appended claims, giving full cognizance to equivalents in all respects.

What is claimed is:

1. A method for selecting a camera of a plurality of cameras, each with a different view of a group of individuals in an environment and providing a video stream, a primary camera of the plurality of cameras having a microphone array, to provide a video stream for provision to a far end, the method comprising:
    utilizing sound source localization using the microphone array on the primary camera to determine direction information;
    identifying a speaker in the group of individuals using the sound source localization direction information and an image from the video stream of the primary camera;
    determining pose information of the speaker in the image from the video stream of the primary camera;
    for each of the plurality of cameras other than the primary camera, determining pose information of each individual in the group of individuals in an image from the video stream of the primary camera;
    for each of the plurality of cameras other than the primary camera, comparing the pose information of each individual in the group of individuals with the pose information of the identified speaker, determining a best pose of the identified speaker in the image from the video stream of the camera; and
    selecting a camera from the plurality of cameras to provide a video stream for provision to a far end based on a determination of the camera having the best frontal view of the identified speaker using pose information after setting an individual as a speaker for each camera.

2. The method of claim 1, wherein selecting a camera from the plurality of cameras is further based on:
    selecting the camera providing the most facial views of attendees when there is not a speaker and there are attendees; and
    selecting a default camera when there are no attendees.

3. The method of claim 1 further comprising machine learning based on neural networks to determine pose boundaries and keypoints.

4. The method of claim 1, further comprising receiving audio from each microphone in the microphone array to perform a sound source localization algorithm to determine a particular individual which is speaking.

5. The method of claim 1, wherein sound source localization and machine learning based on neural networks are implemented by the primary camera and no sound source localization and machine learning based on neural networks are implemented by secondary cameras.

6. The method of claim 1, wherein sound source localization and machine learning based on neural networks are implemented by the primary camera and secondary cameras.

7. The method of claim 2 further comprising determining over a period of time if the selected camera continues to be the default camera.

8. A system for selecting a camera of a plurality of cameras, each with a different view of a group of individuals in an environment, to provide a video stream for provision to a far end, the system comprising:
    a plurality of cameras, one of the plurality of cameras being a primary camera, each camera including:
        an imager;
        an output interface for providing data and a video stream;
        RAM;
        a processor coupled to the imager, the output interface, and the RAM for executing programs; and
        memory coupled to the processor for storing programs executed by the processor, the memory storing programs executed by the processor to perform the operation of providing a video stream from the camera,
    the primary camera further including a microphone array and the memory further storing programs to utilize sound source localization using the microphone array to determine direction information and provide the direction information; and
    a codec coupled to the plurality of cameras, the codec including:
        an input interface for coupling to the plurality of cameras to receive data and video streams;
        a network interface for communicating with the far end;
        RAM;
        a processor coupled to the network interface, the input interface and the RAM for executing programs; and
        memory coupled to the processor for storing programs executed by the processor, the memory storing programs executed by the processor to perform the operation of:
            identifying a speaker in the group of individuals using the sound source localization direction information and an image from the video stream of the primary camera;

determining pose information of the speaker in the image from the video stream of the primary camera;

for each of the plurality of cameras other than the primary camera, determining pose information of each individual in the group of individuals in an image from the video stream of the camera;

for each of the plurality of cameras other than the primary camera, comparing the pose information of each individual in the group of individuals with the pose information of the identified speaker, determining a best pose of the identified speaker in the image from the video stream of the camera; and selecting a camera from the plurality of cameras to provide a video stream for provision to a far end based on a determination of the camera having the best frontal view of the identified speaker using pose information after setting an individual as a speaker for each camera.

9. The system of claim 8, wherein selecting a camera from the plurality of cameras is further based on:

selecting the camera providing the most facial views of attendees when there is not a speaker and there are attendees; and selecting a default camera when there are no attendees.

10. The system of claim 8, wherein the primary camera is built into the codec and the processor, RAM and memory are the processor and memory of the codec.

11. The system of claim 8 further comprising receiving audio from each microphone in the microphone array to perform a sound source localization algorithm to determine a particular individual which is speaking.

12. The system of claim 8, wherein machine learning based on neural networks is implemented by the primary camera for individual face and pose detection.

13. The system of claim 8, wherein machine learning based on neural networks is implemented by the primary camera and each of the other plurality of cameras for individual face and pose detection.

14. The system of claim 13 further comprising a production module bounding boxes of images, feature vectors, poses, and SSL for detected faces of individuals from the primary camera and secondary cameras.

15. The system of claim 14 further comprising room director components for the secondary cameras which send output of machine learning of the secondary cameras to the production module.

16. The system of claim 9 further comprising determining by the processor of the primary camera, over a period of time if the selected camera continues to be the default camera.

17. A camera comprising:

a microphone array on a primary camera utilizing sound source localization to determine direction information;

a processor identifying a speaker in a group of individuals using the sound source localization direction information and an image from a video stream of the primary camera;

a codec for determining pose information of the speaker in the image from the video stream of the primary camera;

for each of a plurality of cameras other than the primary camera, determining by the codec pose information of each individual in the group of individuals in an image from the video stream of the camera;

for each of the plurality of cameras other than the primary camera, comparing by the codec the pose information of each individual in the group of individuals with the pose information of the speaker, determining the best match and setting that individual as the speaker in the image from the video stream of the camera; and selecting by the codec, a camera from the plurality of cameras to provide a video stream for provision to a far end based on a determination of the camera having the best frontal view of the speaker after setting an individual as a speaker for each camera.

18. The camera of claim 17, wherein selecting a camera from the plurality of cameras is further based on:

selecting the camera providing the most facial views of attendees when there is not a speaker and there are attendees; and selecting a default camera when there are no attendees.

19. The camera of claim 17 further comprising receiving audio from each microphone in the microphone array to perform when the sound source localization is performed on the primary camera.

20. The camera of claim 17 further comprising machine learning systems based on neural networks to determine pose boundaries and keypoints.

* * * * *